US009840299B2

(12) United States Patent
Takano

(10) Patent No.: US 9,840,299 B2
(45) Date of Patent: *Dec. 12, 2017

(54) VEHICLE

(71) Applicant: YAMAHA HATSUDOKI KABUSHIKI KAISHA, Iwata-shi, Shizuoka (JP)

(72) Inventor: Kazuhisa Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 58 days.

This patent is subject to a terminal disclaimer.

(21) Appl. No.: 14/896,571

(22) PCT Filed: Jan. 30, 2015

(86) PCT No.: PCT/JP2015/000413
§ 371 (c)(1),
(2) Date: Dec. 7, 2015

(87) PCT Pub. No.: WO2015/115110
PCT Pub. Date: Aug. 6, 2015

(65) Prior Publication Data
US 2016/0107713 A1    Apr. 21, 2016

(30) Foreign Application Priority Data
Jan. 31, 2014    (JP) .................. 2014-017273

(51) Int. Cl.
*B62K 5/10* (2013.01)
*B62K 5/05* (2013.01)
(Continued)

(52) U.S. Cl.
CPC ................ *B62K 5/10* (2013.01); *B62J 35/00* (2013.01); *B62K 5/027* (2013.01); *B62K 5/05* (2013.01); *B62K 5/08* (2013.01); *B62K 2005/001* (2013.01)

(58) Field of Classification Search
CPC ... B62D 5/05; B62D 5/06; B62D 5/08; B62D 5/10; B62D 5/027; B62D 11/02;
(Continued)

(56) References Cited

U.S. PATENT DOCUMENTS 4,351,410 A    9/1982  Townsend
4,719,984 A *  1/1988  Watanabe ............... B60T 1/062
                                                        180/215
(Continued)

FOREIGN PATENT DOCUMENTS

DE    10 2010 052 716 A1    6/2011
JP         69-149874 A      8/1984
(Continued)

OTHER PUBLICATIONS

Official Communication issued in corresponding European Patent Application No. 15743707.0, dated Apr. 12, 2016.
(Continued)

*Primary Examiner* — Barry Gooden, Jr.
(74) *Attorney, Agent, or Firm* — Keating and Bennett, LLP

(57) ABSTRACT

A vehicle includes a left front wheel, a right front wheel, and a rear wheel that tilt together with a body frame, wherein, while a large capacity of a fuel tank is ensured, a variation in the center-of-gravity position of the vehicle while driving is small. When viewed in a side view with the body frame in an upright position, the fuel tank is disposed between a first center and a second center, the first center being located between a third center and right and left front wheel ground contacting portions, the second center being located between the third center and a rear wheel ground contacting portion, the third center being located between the right and the left front wheel ground contacting portions and the rear wheel ground contacting portion.

8 Claims, 14 Drawing Sheets

(51) Int. Cl.
  *B62K 5/08* (2006.01)
  *B62J 35/00* (2006.01)
  *B62K 5/027* (2013.01)
  *B62K 5/00* (2013.01)

(58) Field of Classification Search
  CPC . B62D 11/04; B62J 35/00; B62K 5/05; B62K 5/06; B62K 5/08; B62K 5/10; B62K 5/027; B62K 11/02; B62K 11/04
  See application file for complete search history.

(56) References Cited

U.S. PATENT DOCUMENTS

| | | | | |
|---|---|---|---|---|
| 4,781,258 A * | 11/1988 | Tamura | B60K 11/06 | 180/229 |
| 4,787,470 A * | 11/1988 | Badsey | B62D 61/065 | 180/210 |
| 4,826,057 A * | 5/1989 | Yamada | B62K 5/027 | 180/215 |
| 5,094,315 A * | 3/1992 | Taki | B62K 19/46 | 180/219 |
| D547,242 S | 7/2007 | Lambri | | |
| 7,243,765 B2 * | 7/2007 | Marcacci | B60G 15/063 | 188/300 |
| 7,264,251 B2 * | 9/2007 | Marcacci | B60G 17/0152 | 280/124.103 |
| D598,328 S * | 8/2009 | Lambri | B62K 5/05 | D12/110 |
| 7,648,148 B1 * | 1/2010 | Mercier | B60G 21/007 | 180/210 |
| 8,991,542 B2 * | 3/2015 | Yu | B62K 5/027 | 180/209 |
| 2002/0007977 A1 * | 1/2002 | Ishii | B62J 17/00 | 180/219 |
| 2002/0190494 A1 * | 12/2002 | Cocco | B60G 21/007 | 280/124.135 |
| 2004/0227321 A1 * | 11/2004 | Kuroki | B60G 3/02 | 280/124.135 |
| 2005/0012291 A1 * | 1/2005 | Bagnoli | B62K 5/05 | 280/124.103 |
| 2005/0167174 A1 | 8/2005 | Marcacci | | |
| 2005/0167217 A1 * | 8/2005 | Marcacci | B60G 15/063 | 188/300 |
| 2006/0065456 A1 * | 3/2006 | Noda | B62K 11/04 | 180/219 |
| 2007/0075517 A1 * | 4/2007 | Suhre | B60G 3/20 | 280/124.134 |
| 2007/0199761 A1 * | 8/2007 | Seki | B62K 5/027 | 180/312 |
| 2007/0262548 A1 * | 11/2007 | Rawlinson | B60G 21/007 | 280/124.103 |
| 2009/0107754 A1 * | 4/2009 | Doperalski | B62K 5/027 | 180/337 |
| 2010/0147615 A1 * | 6/2010 | Tsujii | B60G 3/145 | 180/215 |
| 2012/0181783 A1 * | 7/2012 | Nakano | B62K 11/10 | 280/834 |
| 2013/0168944 A1 | 7/2013 | Bartolozzi et al. | | |
| 2013/0247881 A1 * | 9/2013 | Okubo | F02M 25/06 | 123/519 |
| 2013/0248273 A1 * | 9/2013 | Nakamura | F28D 1/00 | 180/229 |
| 2014/0204598 A1 * | 7/2014 | Di Tanna | B60Q 1/12 | 362/460 |
| 2015/0158540 A1 * | 6/2015 | Hara | B62K 11/10 | 180/219 |
| 2015/0166139 A1 * | 6/2015 | Inomori | B62K 11/04 | 180/219 |
| 2016/0056482 A1 * | 2/2016 | Otsuka | B60L 11/1898 | 180/220 |
| 2016/0090141 A1 * | 3/2016 | Mizukura | B62J 35/00 | 180/219 |
| 2016/0107713 A1 * | 4/2016 | Takano | B62K 5/027 | 180/210 |
| 2016/0114850 A1 * | 4/2016 | Takano | B62K 11/04 | 180/210 |

FOREIGN PATENT DOCUMENTS

| | | |
|---|---|---|
| JP | 6-61680 U | 8/1994 |
| JP | 2005-313876 A | 11/2005 |
| JP | 2010-36791 A | 2/2010 |
| JP | 2011-195100 A | 10/2011 |
| WO | 2012/007819 A1 | 1/2012 |

OTHER PUBLICATIONS

Official Communication issued in International Patent Application No. PCT/JP2015/000413, dated Apr. 21, 2015.
Piaggio, "Catalogo Parti Di Ricambio", NTRC000U05, MP3 300 ie LT Touring 2011-2013, ZAPM64102, pp. 1-92.

* cited by examiner

VEHICLE

BACKGROUND OF THE INVENTION

1. Field of the Invention

The present invention relates to a vehicle including a body frame that tilts in a left-right direction of the vehicle during left and right turns, a left front wheel and a right front wheel that tilt (hereinafter, referred to as "tiltable") along with the body frame during left and right turns, and a rear wheel that tilts along with the body frame.

2. Description of the Related Art

A vehicle including a body frame that tilts in a left-right direction of the vehicle during left and right turns, and two front wheels disposed side by side in the left-right direction of the body frame is known (for example, see Japanese Patent Application Laid-Open No. 2005-313876; U.S. Design Pat. No. D547,242S; and Catalogo parti di ricambio, MP3 300 ie LT Mod. ZAPM64102, Piaggio & C. SpA, pp. 76-80). This type of vehicle can turn while the body frame tilts relative to a vertical direction. More specifically, the body frame tilts to the right of the vehicle during a right turn and to the left of the vehicle during a left turn.

The vehicles described in Japanese Patent Application Laid-Open No. 2005-313876; U.S. Design Pat. No. D547,242S; and Catalogo parti di ricambio include link mechanisms. The link mechanisms each include an upper cross member and a lower cross member. The link mechanism also includes a right-side rod that supports right end portions of the upper cross member and the lower cross member, and a left-side rod that supports left end portions of the upper cross member and the lower cross member. An intermediate portion of the upper cross member and the lower cross member is supported by the body frame. The upper cross member and the lower cross member are supported by the body frame so as to be capable of turning (hereinafter, referred to as "turnable") around an axis extending substantially in the front-rear direction of the body frame. The upper cross member and the lower cross member turn relative to the body frame in conjunction with tilting of the body frame, and the relative position of the left front wheel and the right front wheel in the up-down direction of the body frame changes. The upper cross member and the lower cross member are disposed above the left front wheel and the right front wheel in the up-down direction of the body frame, when the body frame is in an upright state.

In the conventional vehicle disclosed in Catalogo parti di ricambio, a fuel tank is disposed in a center tunnel positioned between floor portions on which the rider puts his or her left and right feet (for example, see P76 to P80 of Catalogo parti di ricambio and FIG. 3 of U.S. Design Pat. No. D547,242S).

The weight of the fuel tank including the fuel changes depending on the remaining fuel. The center of gravity of the fuel tank also changes depending on the remaining fuel. Therefore, in a general vehicle, the center of gravity of the vehicle changes depending on the remaining fuel during the operation of vehicle.

Meanwhile, downsizing the fuel tank to reduce the weight variation of the fuel tank causes a reduction in the capacity of the fuel tank.

SUMMARY OF THE INVENTION

Preferred embodiments of the present invention provide a vehicle including a left front wheel and a right front wheel that tilt along with a body frame, and a rear wheel that tilts along with the body frame, wherein an amount of change in the center of gravity of the vehicle during operation of vehicle is small while a large capacity of the fuel tank is ensured.

A vehicle according to a preferred embodiment of the present invention includes a body frame; a right front wheel and a left front wheel disposed side by side in a left-right direction of the body frame, the right and the left front wheels being tiltable in a left-right direction of the vehicle along with the body frame; a rear wheel being tiltable in the left-right direction of the vehicle along with the body frame; a right front wheel support including an upper portion, and a lower portion that supports the right front wheel; a left front wheel support including an upper portion, and a lower portion that supports the left front wheel; a link mechanism including a right-side rod that supports the upper portion of the right front wheel support such that the upper portion thereof is turnable around a right axis extending in an up-down direction of the body frame, a left-side rod that supports the upper portion of the left front wheel support such that the upper portion thereof is turnable around a left axis which is parallel or substantially parallel to the right axis, an upper cross member including a right end portion that supports an upper portion of the right-side rod such that the upper portion thereof is turnable, a left end portion that supports an upper portion of the left-side rod such that the upper portion thereof is turnable, and an intermediate portion that is supported by the body frame so as to be turnable around an upper axis extending in a front-rear direction of the body frame, and a lower cross member including a right end portion that supports a lower portion of the right-side rod such that the lower portion thereof is turnable, a left end portion that supports a lower portion of the left-side rod such that the lower portion thereof is turnable, and an intermediate portion that is supported by the body frame so as to be turnable around a lower axis which is parallel or substantially parallel to the upper axis; a power unit that generates a driving force of the rear wheel; and a fuel tank that stores fuel supplied to the power unit, in which the fuel tank is disposed between a first center and a second center, the first center being located between a third center and right and left front wheel ground contacting portions, the second center being located between the third center and a rear wheel ground contacting portion, the third center being located between the right and the left front wheel ground contacting portions and the rear wheel ground contacting portion in the front-rear direction of the body frame in a side view when the body frame is in the upright state, the right front wheel ground contacting portion, the left front wheel ground contacting portion, and the rear wheel ground contacting portion being where the right front wheel, the left front wheel, and the rear wheel contact the ground, respectively, and a left end of the fuel tank is disposed on the left of a center between a center of the upper cross member and the lower cross member and left ends of the upper cross member and the lower cross member, and a right end of the fuel tank is disposed on the right of a center between the center of the upper cross member and the lower cross member and right ends of the upper cross member and the lower cross member in the left-right direction of the body frame in a plan view when the body frame is in the upright state.

According to a preferred embodiment of the present invention, the front portion of the vehicle has a width in the left-right direction of the vehicle such that the left front wheel and the right front wheel are disposed side by side in the left-right direction. Therefore, it is easy to mount a fuel tank with a large width in the left-right direction of the vehicle on the vehicle. According to a preferred embodiment of the present invention, the left end of the fuel tank is disposed on the left of the center between the center of the upper cross member and the lower cross member and the left ends of the upper cross member and the lower cross member, and the right end of the fuel tank is disposed on the right of the center between the center of the upper cross member and the lower cross member and the right ends of the upper cross member and the lower cross member. Therefore, the width of the fuel tank in the left-right direction of the vehicle is large. As a result, according to a preferred embodiment of the present invention, the width of the fuel tank in the height direction is reduced, while a large capacity of the fuel tank is ensured. The fuel tank is disposed between the first center and the second center. As a result, the fuel tank is disposed near the center of gravity of the vehicle with the rider on the vehicle. Therefore, a fuel tank having a reduced height while ensuring a large capacity of the fuel tank is disposed near the center of gravity of the vehicle, and a vehicle is provided with a small amount of change in the center of gravity of the vehicle based on the remaining fuel during operation. As a result, a vehicle with a small amount of change in the center of gravity of the vehicle based on the remaining fuel during the operation is provided, while a large capacity of the fuel tank is ensured.

The preferred embodiments of the present invention may include the following aspects.

A vehicle according to a second aspect of various preferred embodiments of the present invention includes a rear end of the fuel tank disposed forward of the third center.

In the vehicle of the second aspect, the front portion of the vehicle has a width in the left-right direction of the vehicle to accommodate the disposition of the left front wheel, the right front wheel, and the link mechanism. Therefore, the width of the vehicle of the second aspect in the left-right direction of the vehicle is large in an area forward of the center between the right and left front wheel ground contacting portions and the rear wheel ground contacting portion in the front-rear direction of the body frame. According to the vehicle of the second aspect, the rear end of the fuel tank is disposed forward of the center between the right and left front wheel ground contacting portions and the rear wheel ground contacting portion, so that it is easy to dispose a fuel tank with a large width in the left-right direction of the vehicle. Therefore, a vehicle is provided with a small amount of change in the center of gravity of the vehicle during operation, while a large capacity of the fuel tank is ensured.

A vehicle according to a third aspect of various preferred embodiments of the present invention includes the fuel tank overlapping with the third center.

In the vehicle of the third aspect, the fuel tank is large in the front-rear direction of the body frame. Therefore, the width of the fuel tank in the up-down direction of the vehicle may be reduced, while a large capacity of the fuel tank is ensured.

As a result, a vehicle is provided with a small amount of change in the center of gravity of the vehicle during operation, while a large capacity of the fuel tank is ensured.

A vehicle according to a fourth aspect of various preferred embodiments of the present invention includes a front end of the fuel tank disposed behind the third center.

The link mechanism supports a left front wheel support and a right front wheel support such that the left and right front wheel support are turnable, the left and right front wheel supports including upper portions and lower portions that support the left and right front wheels, respectively.

Therefore, the front end of the fuel tank is disposed behind the center between the right and left front wheel ground contacting portions and the rear wheel ground contacting portion in the front-rear direction of the body frame. As a result, the movable range of the link mechanism associated with tilting of the body frame in the left-right direction of the vehicle and the movable range of the left and right front wheels associated with tilting of the body frame in the left-right direction of the vehicle are ensured, and the degree of freedom in the disposition of the fuel tank is high. Therefore, a vehicle is provided with a small amount of change in the center of gravity of the vehicle during operation, while a large capacity of the fuel tank is ensured.

A vehicle according to a fifth aspect of various preferred embodiments of the present invention further includes a seat including a seating surface on which a rider sits, in which the fuel tank is disposed below the seating surface in the up-down direction of the body frame.

According to the vehicle of the fifth aspect, the fuel tank is close to the center of gravity of the vehicle with the rider on the vehicle. Therefore, a vehicle with a small amount of change in the center of gravity of the vehicle based on the remaining fuel is provided. The seating surface of the seat has a width in the left-right direction of the vehicle. Therefore, disposing the fuel tank below the seating surface of the seat in the up-down direction of the body frame easily increases the width of the fuel tank in the left-right direction of the vehicle. As a result, a vehicle is provided with a small amount of change in the center of gravity of the vehicle during operation, while a large capacity of the fuel tank is ensured.

A vehicle according to a sixth aspect of various preferred embodiments of the present invention includes the body frame including a right frame portion and a left frame portion that are disposed below the seat in the up-down direction of the body frame, in which the fuel tank is disposed above the right and the left frame portions in the up-down direction of the body frame.

According to the vehicle of the sixth aspect, the width of the fuel tank in the left-right direction of the vehicle is greater than the width of the right frame portion and the left frame portion in the left-right direction of the vehicle. The fuel tank with a large width in the left-right direction of the vehicle is fixed to the right frame portion and the left frame portion. Therefore, a vehicle is provided with a small amount of change in the center of gravity of the vehicle during operation, while a large capacity of the fuel tank is ensured.

A vehicle according to a seventh aspect of various preferred embodiments of the present invention includes a seat including a seating surface on which a rider sits, and a floor portion positioned forward of the seat in the front-rear direction of the body frame, the floor portion including a floor surface on which the rider sitting on the seat puts his or her feet, in which the fuel tank is disposed below the floor surface in the up-down direction of the body frame.

In the vehicle of the seventh aspect, the front portion of the vehicle has a width in the left-right direction of the vehicle such that the left front wheel and the right front wheel are disposed side by side in the left-right direction of the vehicle. Therefore, it is easy to increase the width of the floor portion positioned forward of the seat in the left-right direction of the vehicle. As a result, according to the vehicle of the seventh aspect, the width of the fuel tank in the up-down direction of the vehicle may be small even when a large capacity of the fuel tank is ensured, so that the fuel tank is disposed below the floor surface in the up-down direction of the body frame. The fuel tank is disposed below the floor surface in the up-down direction of the body frame so that a vehicle with a small change in the center of gravity of the vehicle during the operation is provided. Therefore, a vehicle is provided with a small amount of change in the center of gravity of the vehicle during operation, while a large capacity of the fuel tank is ensured.

A vehicle according to an eighth aspect of various preferred embodiments of the present invention includes the body frame including a left frame portion and a right frame portion below the floor surface in the up-down direction of the body frame, the left and the right frame portions extend in the front-rear direction of the body frame, and the fuel tank is disposed between the left frame portion and the right frame portion.

According to the vehicle of the eighth aspect, the fuel tank is disposed between the left frame portion and the right frame portion even when the fuel tank with a large width in the left-right direction of the vehicle is disposed at a low position below the floor portion in the up-down direction of the body frame. Therefore, the fuel tank is protected when the body frame tilts in the left-right direction of the vehicle. As a result, a vehicle is provided with a small amount of change in the center of gravity of the vehicle during operation, while a large capacity of the fuel tank is ensured.

Preferred embodiments of the present invention provide a vehicle including a left front wheel and a right front wheel that tilt along with a body frame, and a rear wheel that tilts along with the body frame, in which the amount of change in the center of gravity during the operation of the vehicle is small, while a large capacity of a fuel tank is ensured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the accompanying drawings.

Figure 8:
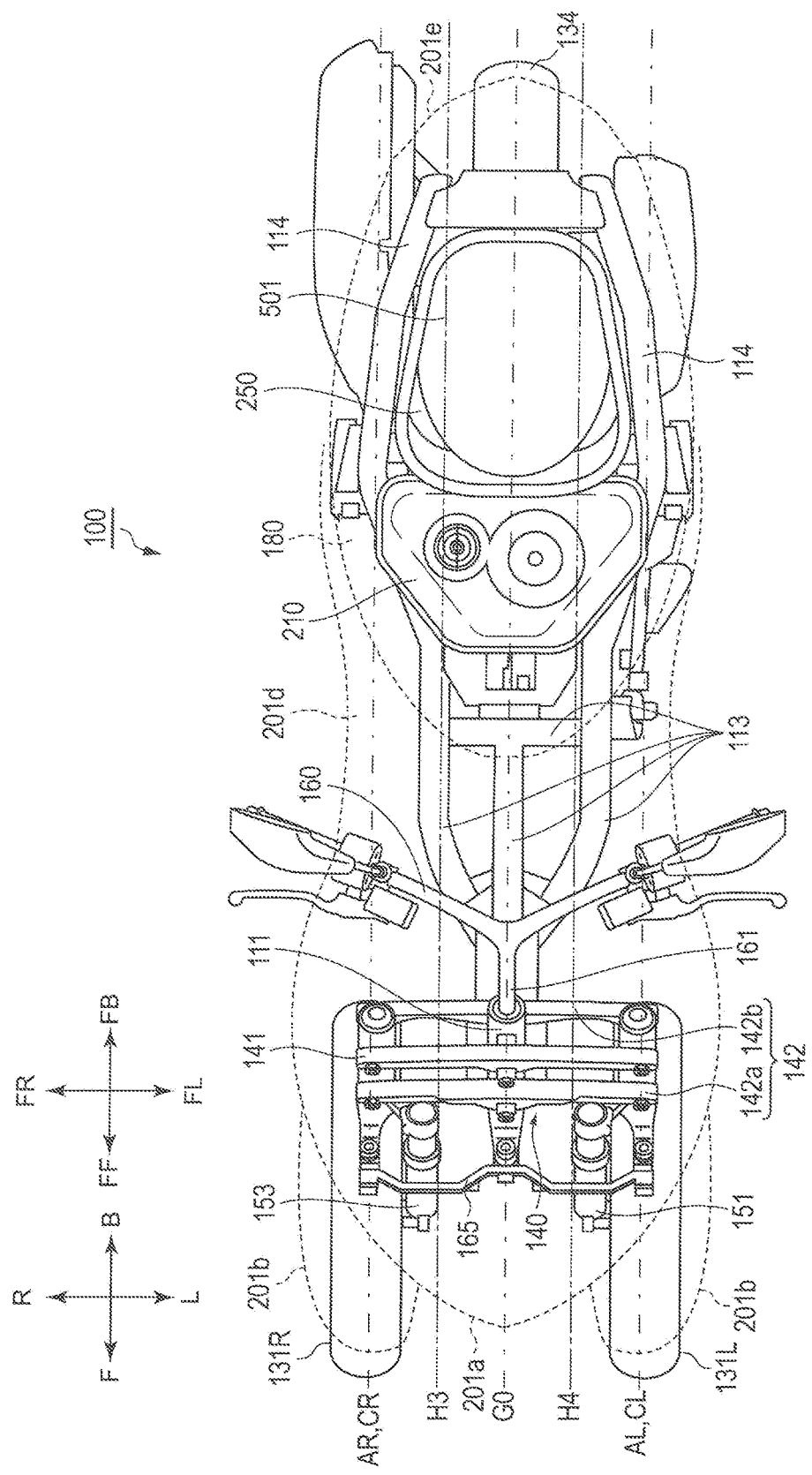
FIG. 8 is a plan view showing a first variation of a disposition of a fuel tank on the vehicle according to the first preferred embodiment of the present invention.

In the accompanying drawings, arrow F denotes a front direction of vehicle 100, and arrow B denotes a rear (or back) direction of vehicle 100. Arrow U denotes an upward direction of vehicle 100, and arrow D denotes a downward direction of vehicle 100. Arrow R denotes a right direction of vehicle 100, and arrow L denotes a left direction of vehicle 100. Body frame 110 tilts in a left-right direction of vehicle 100 relative to a vertical line to turn vehicle 100. Therefore, in addition to the directions of vehicle 100, directions based on body frame 110 are defined. Arrow FF in the accompanying drawings denotes a front direction based on body frame 110, and arrow FB denotes a rear direction based on body frame 110. Arrow FU denotes an upward direction based on body frame 110, and arrow FD denotes a downward direction based on body frame 110. Arrow FR denotes a right direction based on body frame 110, and arrow FL denotes a left direction based on body frame 110. In the description, a front-rear direction of vehicle 100, an up-down direction of vehicle 100, and the left-right direction of vehicle 100 denote front-rear, up-down, and left-right directions as viewed from a rider driving vehicle 100 and are directions based on vehicle 100. In this description, a front-rear direction of body frame 110, an up-down direction of body frame 110, and a left-right direction of body frame 110 are front-rear, up-down, and left-right directions as viewed from the rider driving vehicle 100 and are directions based on body frame 110. A center in a vehicle width direction denotes a center of the vehicle width in the left-right direction of vehicle 100. In other words, the center in the vehicle width direction denotes a center in the left-right direction of vehicle 100. In this description, an upright state denotes a state in which the up-down direction of body frame 110 coincides with the vertical line, and handlebar 160 is not steered. The state in which handlebar 160 is not steered denotes a state in which rotation axes of left front wheel 131L and right front wheel 131R are orthogonal or substantially orthogonal to the front-rear direction of body frame 110 in a plan view. In other words, the state in which handlebar 160 is not steered is a state in which steering shaft 161 is not turned or a state in which handlebar 160 is not turned as shown in FIG. 8. In the upright state, the direction of vehicle 100 coincides with the direction of body frame 110. When body frame 110 tilts in the left-right direction relative to the vertical direction to turn vehicle 100, the left-right direction of vehicle 100 does not coincide with the left-right direction of body frame 110. The up-down direction of vehicle 100 does not coincide with the up-down direction of body frame 110, either. However, the front-rear direction of vehicle 100 coincides with the front-rear direction of body frame 110.

In the present description, an axis extending in the front-rear direction denotes not only an axis parallel or substantially parallel to the front-rear direction of body frame 110, but also includes an axis tilted in a range of ±45 degrees relative to the front-rear direction of body frame 110. An axis extending in a direction closer to the front-rear direction than to the left-right direction and the up-down direction is included in the axis extending in the front-rear direction. Similarly, an axis extending in the up-down direction includes an axis tilted in a range of ±45 degrees relative to the up-down direction of body frame 110. An axis extending in a direction closer to the up-down direction than to the front-rear direction and the left-right direction is included in the axis extending in the up-down direction. An axis extending in the left-right direction includes an axis tilted in a range of ±45 degrees relative to the left-right direction of body frame 110. An axis extending in a direction closer to the left-right direction than to the front-rear direction and the up-down direction is included in the axis extending in the left-right direction.

In the present description, when it is mentioned that a portion of body frame 110 "extends in the front-rear direction," it is only necessary that the extending direction includes a component of body frame 110 in the front-rear direction, and this includes a mode in which the portion extends in an oblique front-rear direction inclined up, down, left, or right.

Figure 1:
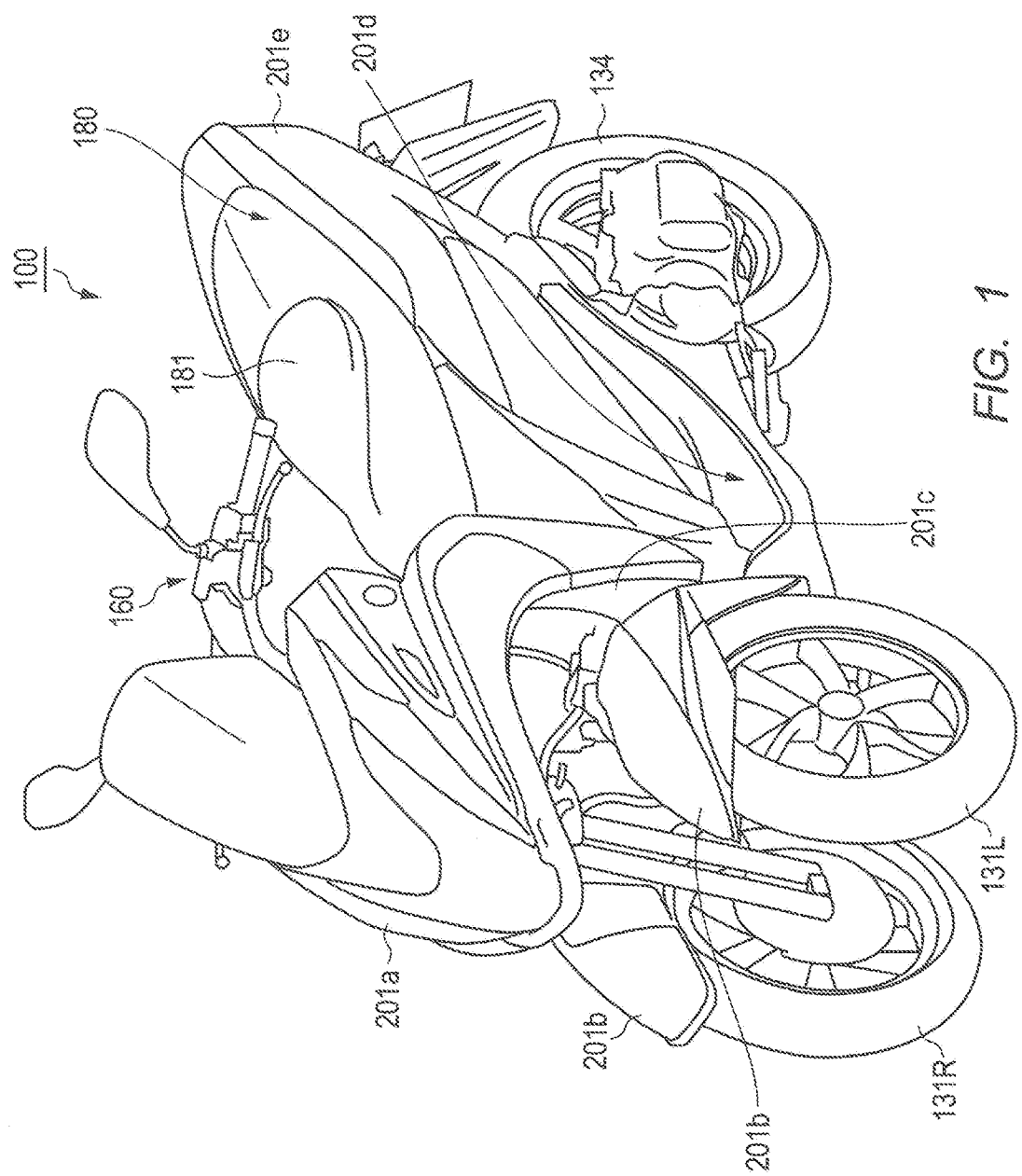
FIG. 1 is a perspective view showing a vehicle according to a first preferred embodiment of the present invention.
Figure 2:
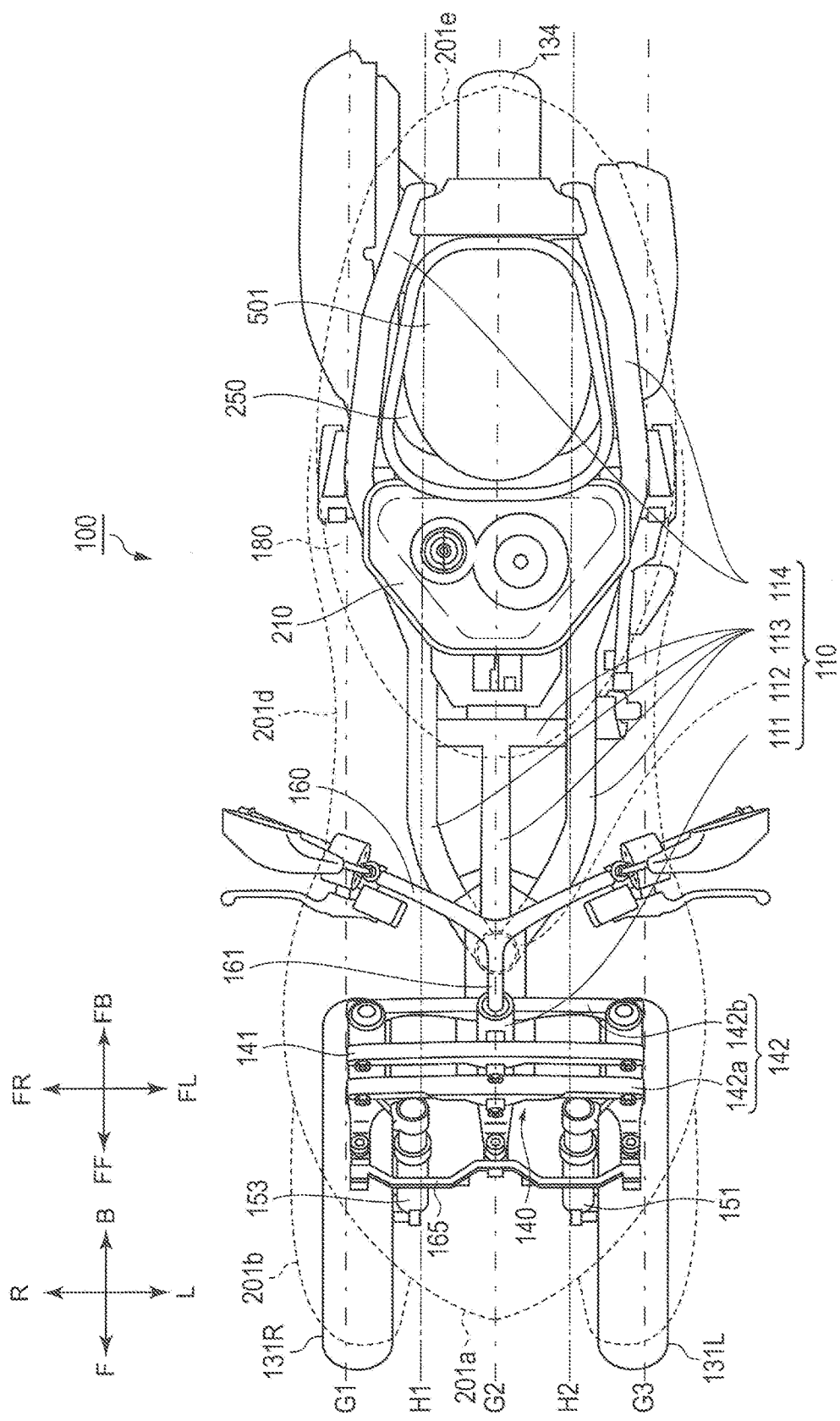
FIG. 2 is a plan view showing a state in which an exterior is removed from the vehicle according to the first preferred embodiment of the present invention.
Figure 3:
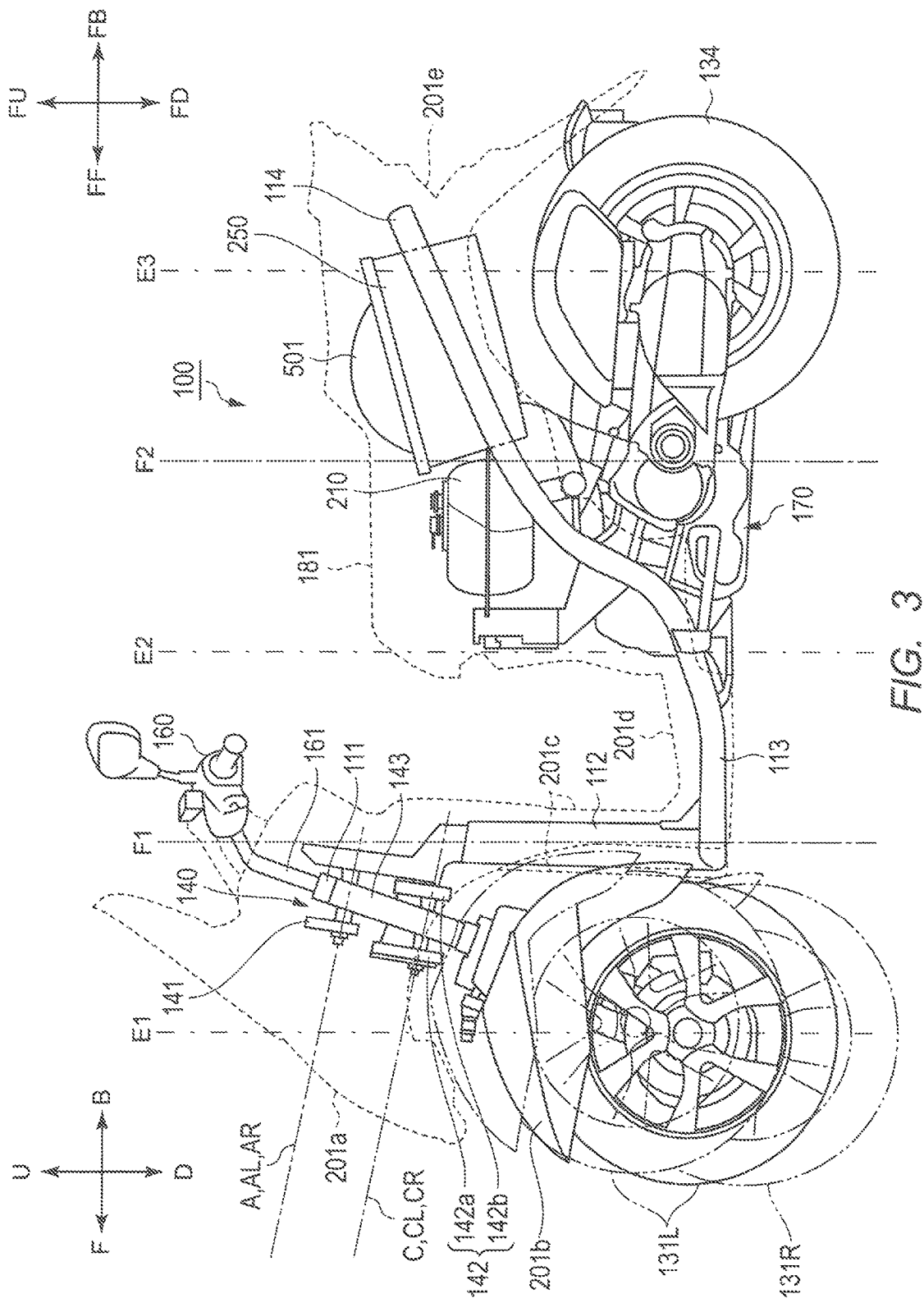
FIG. 3 is a side view showing the state in which the exterior is removed from the vehicle according to the first preferred embodiment of the present invention.

FIG. 1 is a perspective view showing a vehicle according to a first preferred embodiment of the present invention. FIG. 2 is a plan view showing a state in which an exterior is removed from the vehicle. FIG. 3 is a side view showing a state in which the exterior is removed from the vehicle. Broken lines indicate the exterior of vehicle 100 in FIGS. 2 and 3. In FIG. 3, alternate long and two short dashes lines indicate left front wheel 131L and right front wheel 131R when vehicle 100 tilts in the left-right direction.

As shown in FIG. 1, vehicle 100 of the present preferred embodiment includes left front wheel 131L, right front wheel 131R, rear wheel 134, handlebar 160, seat 180, and body covers (201a, 201b, 201c, 201d, and 201e). As shown in FIGS. 2 and 3, vehicle 100 also includes link mechanism 140, body frame 110 (see FIG. 2), power unit 170 (see FIG. 3), fuel tank 210, and storage case 250.

Body frame 110 holds the components of vehicle 100. Body frame 110 includes link support 111, down frame 112, underframes 113, and rear frames 114 (see FIGS. 2 and 3).

Link support 111 is disposed on a front portion of vehicle 100. Link support 111 supports link mechanism 140. Although not particularly limited, link support 111 preferably also defines and functions as a head tube in the present preferred embodiment. Link support 111 as a head tube is tilted relative to the vertical direction so that the upper portion is positioned behind the lower portion in a side view of the vehicle 100. Link support 111 as a head tube supports handlebar 160 and steering shaft 161. Steering shaft 161 is inserted into link support 111 as a head tube so as to be turnable.

Down frame 112 extends below from link support 111 and is connected to underframe 113. Underframe 113 is disposed on the bottom of vehicle 100 and forward of seat 180 in a plan view. Underframe 113 supports floor portion 201d that is a body cover described below.

Rear frame 114 extends toward the rear portion of vehicle 100 from the rear end of underframe 113 and supports seat 180, fuel tank 210, storage case 250, and power unit 170.

Rear frames 114 are disposed on the left and right of vehicle 100. Power unit 170 may be supported by rear frame 114 through a swing arm.

Power unit 170 generates a driving force of rear wheel 134. Power unit 170 includes an engine, crankcase 171 housing a crankshaft, and a transmission case housing a transmission.

Power unit 170 is disposed behind left front wheel 131L, right front wheel 131R, and link mechanism 140 in the front-rear direction of body frame 110. Although not particularly limited, power unit 170 is preferably disposed behind the rear end of floor portion 201d in the front-rear direction of body frame 110 in the first preferred embodiment of the present invention.

The body cover includes front cover 201a, front fenders 201b provided on the left and right, leg shield 201c, floor portion 201d, and rear cover 201e.

Front cover 201a covers at least a portion of the front of link mechanism 140.

Leg shield 201c is positioned behind link mechanism 140 and behind at least a portion of left front wheel 131L and right front wheel 131R. Leg shield 201c covers the front portion and the rear portion of down frame 112. Leg shield 201c is connected to floor portion 201d.

Floor portion 201d includes a floor surface for the rider seated on seat 180 to put his/her feet on. The floor surface is disposed forward of seat 180 and behind leg shield 201c in a plan view and is disposed at a position lower than upper ends of left front wheel 131L and right front wheel 131R in a side view. Although not particularly limited, the width of floor portion 201d is preferably the same or substantially the same as the length from the left end of left front wheel 131L to the right end of right front wheel 131R in the first preferred embodiment of the present invention.

Rear cover 201e covers the surroundings of rear frames 114.

Seat 180 includes seating surface 181 on which the rider sits. At least a portion of seating surface 181 overlaps with at least a portion of power unit 170 in the front-rear direction of body frame 110.

Storage case 250 is disposed below the rear portion of seat 180. The upper portion of storage case 250 is covered by seat 180. Commodities can be taken in and out of storage case 250 when seat 180 is open. Although not particularly limited, helmet 501 may be housed in storage case 250 in the first preferred embodiment of the present invention.

Fuel tank 210 stores fuel for power unit 170. A fuel hose is connected to fuel tank 210. The fuel is supplied from fuel tank 210 to power unit 170 through the fuel hose. The vertical width of fuel tank 210 is smaller than the width of fuel tank 210 in the left-right direction of the vehicle and the width of fuel tank 210 in the front-rear direction of the vehicle.

Left front wheel 131L and right front wheel 131R are disposed side by side in the left-right direction of body frame 110. Left front wheel 131L and right front wheel 131R tilt in the left-right direction along with body frame 110.

Rear wheel 134 is supported by a swing arm supported by body frame 110 or power unit 170 such that the swing arm is turnable. The swing arm is connected to rear frame 114 through a suspension. The suspension restricts the movement of the swing arm in the turning direction. Rear wheel 134 inclines in the left-right direction along with body frame 110.

Figure 4:
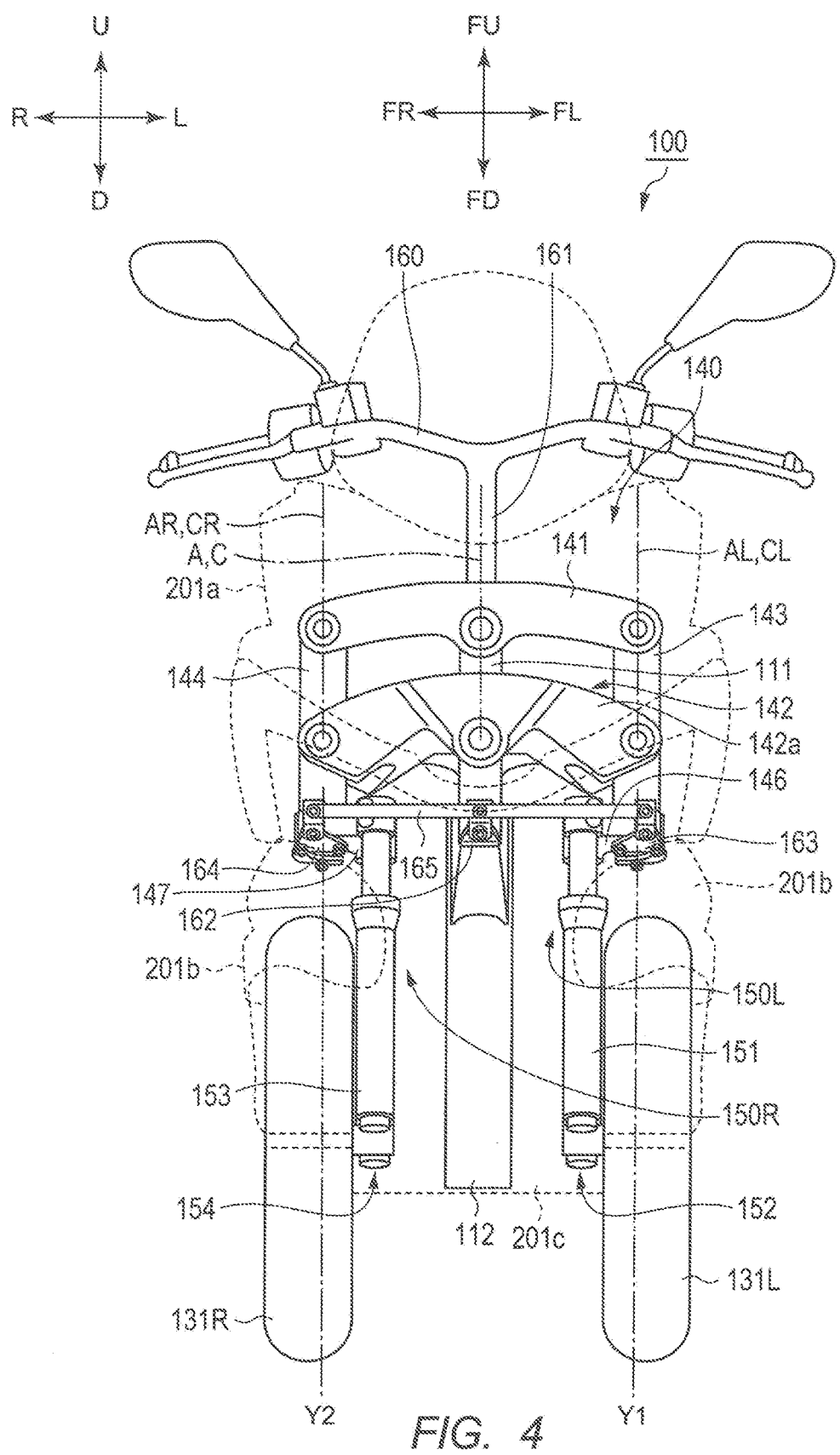
FIG. 4 is a front view showing a left front wheel, a right front wheel, a link mechanism, and their surroundings.
Figure 5:
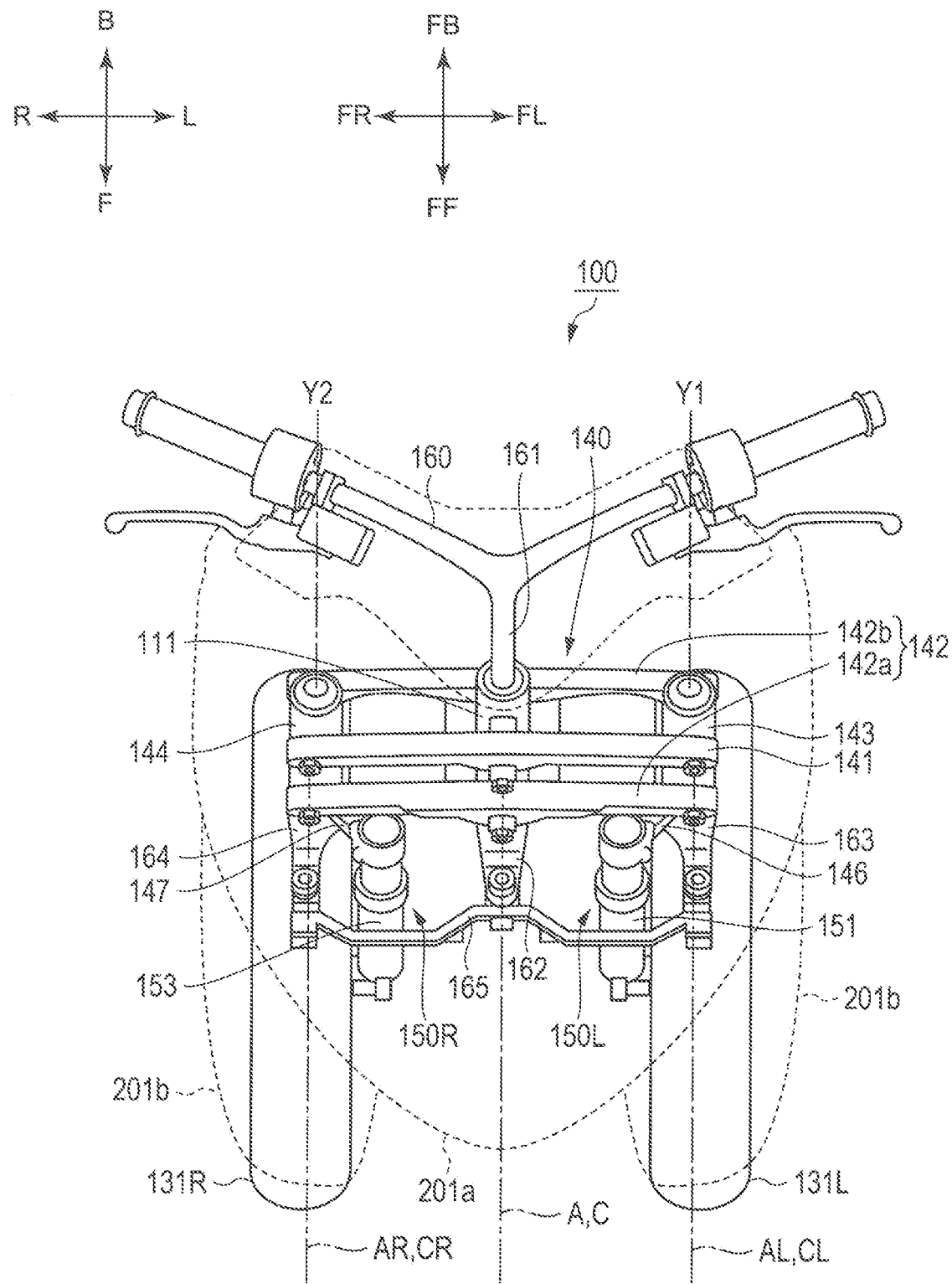
FIG. 5 is a plan view showing the left front wheel, the right front wheel, the link mechanism, and their surroundings.
Figure 6:
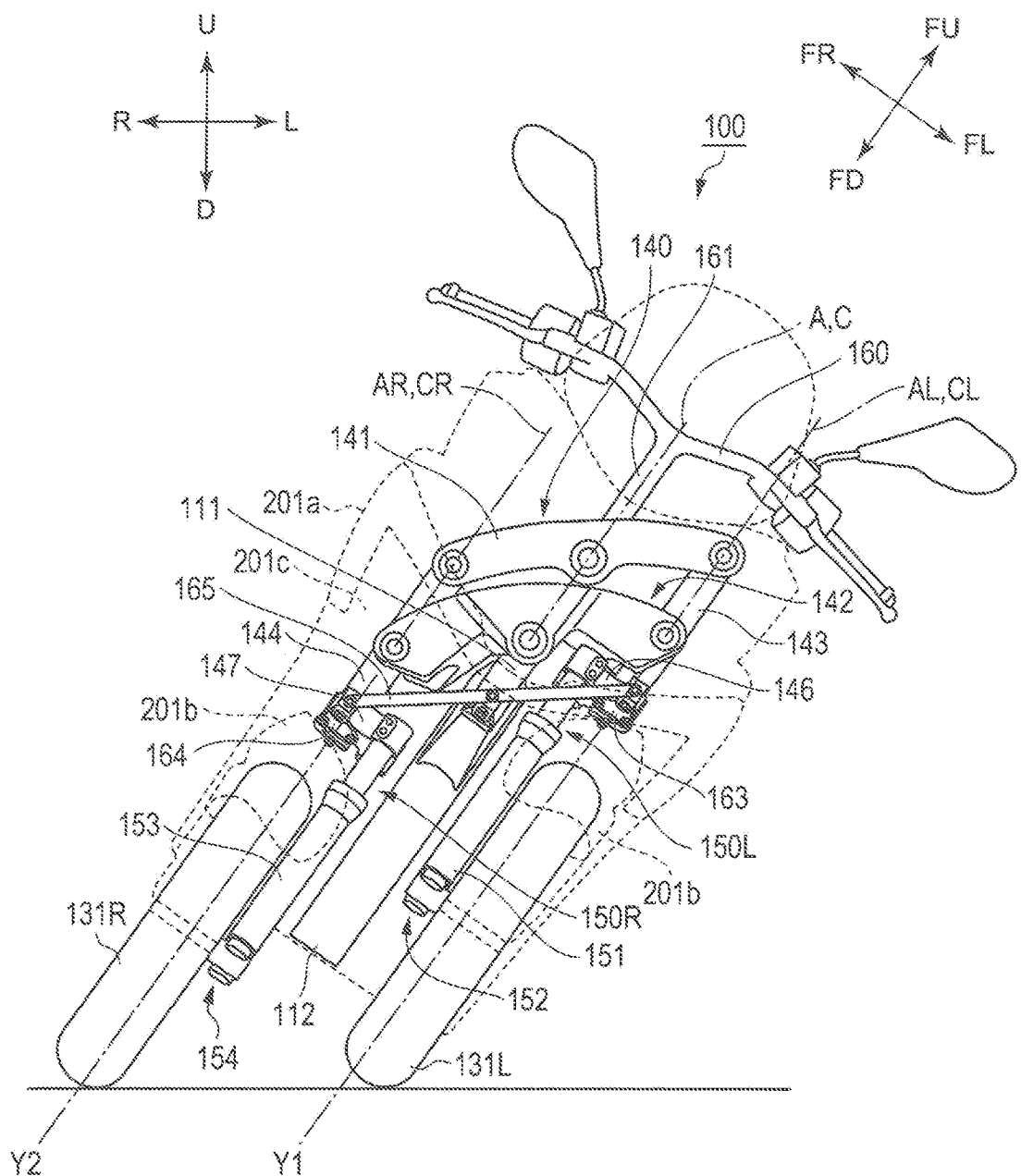
FIG. 6 is a front view showing a state of the link mechanism and the surroundings of the link mechanism when the vehicle tilts.
Figure 7:
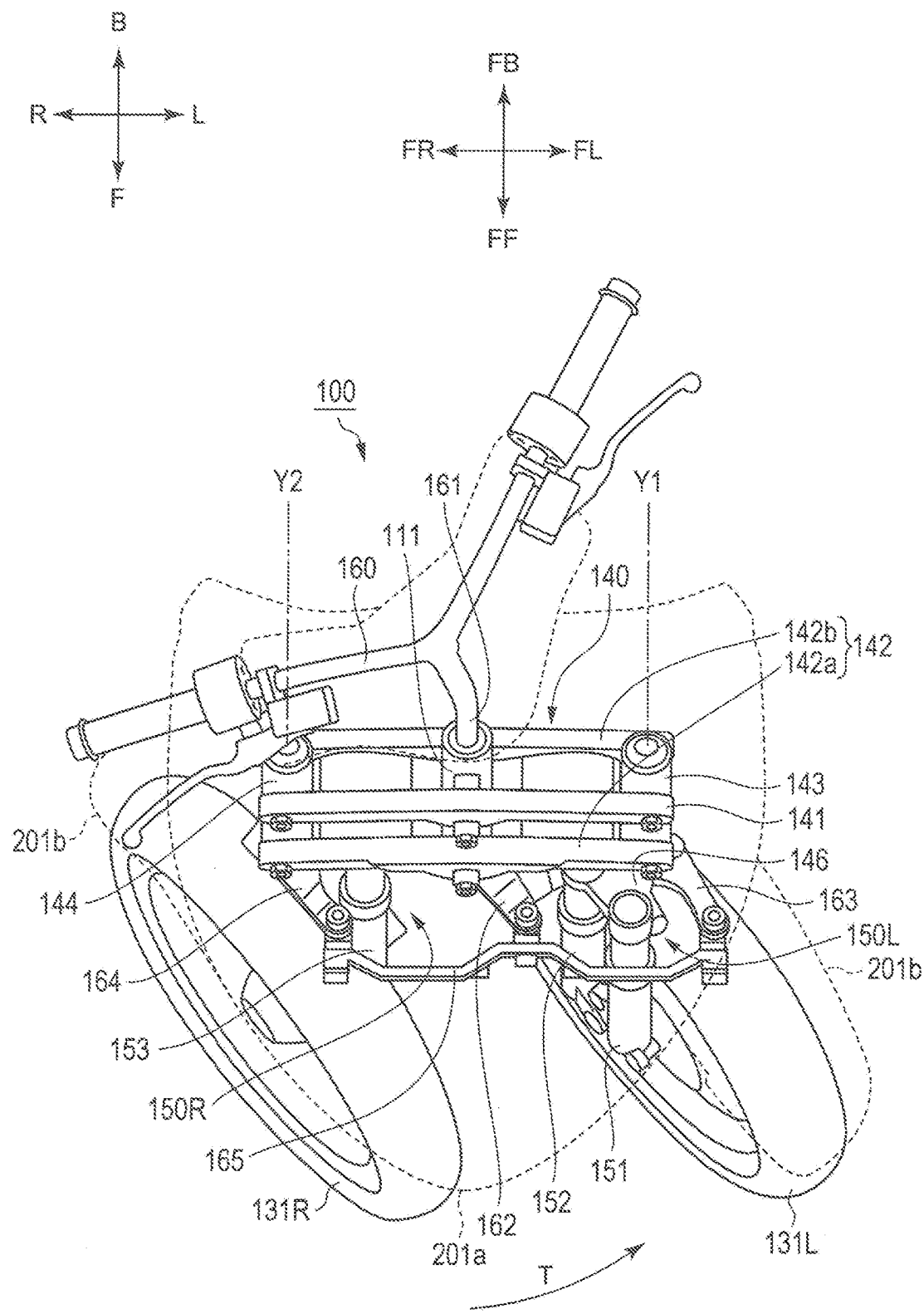
FIG. 7 is a plan view showing a state of the link mechanism and the surroundings of the link mechanism when the direction of a handlebar is changed.

FIG. 4 is a front view showing the left front wheel, the right front wheel, the link mechanism, and their surroundings. FIG. 5 is a plan view showing the left front wheel, the right front wheel, the link mechanism, and their surroundings. FIG. 6 is a front view showing a state of the link mechanism and the surroundings of the link mechanism when the vehicle tilts. FIG. 7 is a plan view showing a state of the link mechanism and the surroundings of the link mechanism when the direction of the handlebar is changed.

Link mechanism 140 preferably includes a parallel or substantially parallel four-bar linkage (also called parallelogram link).

Link mechanism 140 is supported by link support 111 of body frame 110. Link mechanism 140 includes upper cross member 141, lower cross member 142, left-side rod 143, and right-side rod 144 as components that perform a tilting action of vehicle 100.

As shown in FIG. 4, upper cross member 141 and lower cross member 142 of link mechanism 140 are disposed below handlebar 160 and above the upper ends of left front wheel 131L and right front wheel 131R in a side view when body frame 110 is in the upright state. As shown in FIG. 5, upper cross member 141 and lower cross member 142 of link mechanism 140 overlap with left front wheel 131L and right front wheel 131R in the front-rear direction of body frame 110. More specifically, upper cross member 141 and lower cross member 142 of link mechanism 140 are disposed between a vertical line passing through the front end of right front wheel 131R and a vertical line passing through the rear end of right front wheel 131R and between a vertical line passing through the front end of left front wheel 131L and a vertical line passing through the rear end of left front wheel 131L in a side view. Upper cross member 141 and lower cross member 142 of link mechanism 140 are disposed behind the ground contacting portions of left front wheel 131L and right front wheel 131R in the front-rear direction of body frame 110.

An intermediate portion of upper cross member 141 is supported by link support 111. Upper cross member 141 is supported so as to be turnable around upper axis A (see FIG. 3) extending in the front-rear direction of body frame 110. Specifically, upper axis A is parallel or substantially parallel to plane FF-FU and is tilted 45 degrees or less in the direction of arrow FU from arrow FF.

A left end portion of upper cross member 141 is supported by left-side rod 143. Upper cross member 141 is turnable relative to left-side rod 143, around upper left axis AL parallel or substantially parallel to upper axis A. A right end portion of upper cross member 141 is supported by right-side rod 144. Upper cross member 141 is turnable relative to right-side rod 144, around upper right axis AR parallel or substantially parallel to upper axis A.

An intermediate portion of lower cross member 142 is supported by link support 111. Lower cross member 142 is supported so as to be turnable around lower axis C (see FIG. 3) parallel or substantially parallel to upper axis A. Lower cross member 142 is disposed below upper cross member 141. Lower cross member 142 has a length the same or substantially the same as the upper cross member 141 in the left-right direction of the vehicle and is disposed parallel or substantially parallel to upper cross member 141.

A left end of lower cross member 142 is supported by left-side rod 143. Lower cross member 142 is turnable relative to left-side rod 143, around lower left axis CL parallel or substantially parallel to lower axis C. A right end portion of lower cross member 142 is supported by right-side rod 144. Lower cross member 142 is turnable relative to right-side rod 144, around lower right axis CR parallel or substantially parallel to lower axis C.

Although not particularly limited, lower cross member 142 of link mechanism 140 preferably includes front lower cross member 142a including a portion positioned forward of link support 111, left-side rod 143, and right-side rod 144; and rear lower cross member 142b including a portion positioned behind link support 111, left-side rod 143, and right-side rod 144 (see FIGS. 3 and 5) in the present preferred embodiment.

Left-side rod 143 is disposed on the left of link support 111 and extends parallel or substantially parallel to the direction of the extension of link support 111. Left-side rod 143 is disposed above left front wheel 131L. Left-side rod 143 supports left shock absorber 150L described below such that the left shock absorber 150L is turnable around left axis Y1. Left shock absorber 150L is an example of a left front wheel support.

Right-side rod 144 is disposed on the right of link support 111 and extends parallel or substantially parallel to the direction of the extension of link support 111. Right-side rod 144 is disposed above right front wheel 131R. Right-side rod 144 supports right shock absorber 150R described below such that the right shock absorber 150R is turnable around right axis Y2. Right shock absorber 150R is an example of a right-front-wheel support.

In this manner, upper cross member 141, lower cross member 142, left-side rod 143, and right-side rod 144 are supported so that upper cross member 141 and lower cross member 142 maintain positions parallel or substantially parallel to each other, and left-side rod 143 and right-side rod 144 maintain positions parallel or substantially parallel to each other.

As shown in FIG. 6, link mechanism 140 tilts left front wheel 131L and right front wheel 131R when vehicle 100 tilts in the left-right direction (R-L direction). Link mechanism 140 relatively changes the levels of left front wheel 131L and right front wheel 131R in the up-down direction of body frame 110 (direction of arrows FU and FD) in response to body frame 110 that is tilting in the left-right direction.

A steering mechanism is disposed between handlebar 160 and left and right front wheels 131L and 131R. The steering mechanism includes steering shaft 161, center steering arm 162 (see FIG. 7), tie rod 165, left steering arm 163, right steering arm 164, left shock absorber 150L, and right shock absorber 150R.

Left shock absorber 150L includes left damper 151, left bracket 146, and left turn prevention mechanism 152. Left shock absorber 150L is supported by left-side rod 143 and tilts along with left-side rod 143.

Left damper 151 attenuates vibrations from a road by, for example, a telescopic structure. An upper end of left damper 151 is fixed to left bracket 146. A lower end of the left damper supports left front wheel 131L. In this manner, left damper 151 absorbs displacement of left front wheel 131L relative to an upper portion of left damper 151 in the up-down direction of body frame 110. The expansion and contraction direction of left damper 151 may be tilted from the up-down direction of body frame 110. In this case, left front wheel 131L is also displaced relative to the upper portion of left damper 151 in the front-rear direction or the left-right direction of body frame 110. In this case, left damper 151 also absorbs the displacement of left front wheel 131L in the front-rear direction or the left-right direction.

Left turn prevention mechanism 152 is disposed parallel or substantially parallel to left damper 151. Left turn prevention mechanism 152 preferably includes a telescopic structure. An upper end of left turn prevention mechanism 152 is fixed to left bracket 146. A lower end of left turn prevention mechanism 152 supports left front wheel 131L.

Left damper 151 and left turn prevention mechanism 152 support left front wheel 131L to associate left bracket 146 with left front wheel 131L to prevent a relative change in the direction of left bracket 146 and the direction of left front wheel 131L.

Right shock absorber 150R includes right damper 153, right bracket 147, and right turn prevention mechanism 154. Right shock absorber 150R is supported by right-side rod 144 and tilts along with right-side rod 144.

Right damper 153 attenuates vibrations from a road by, for example, a telescopic structure. An upper end of right damper 153 is fixed to right bracket 147. A lower end of right damper 153 supports right front wheel 131R. In this manner, right damper 153 absorbs displacement of right front wheel 131R relative to an upper portion of right damper 153 in the up-down direction of body frame 110. The expansion and contraction direction of right damper 153 may be tilted from the up-down direction of body frame 110. In this case, right front wheel 131R is also displaced relative to the upper portion of right damper 153 in the front-rear direction or the left-right direction of body frame 110. In this case, right damper 153 also absorbs the displacement in the front-rear direction or the left-right direction of right front wheel 131R.

Right turn prevention mechanism 154 is disposed parallel or substantially parallel to right damper 153. Right turn prevention mechanism 154 preferably includes a telescopic structure. An upper end of right turn prevention mechanism 154 is fixed to right bracket 147. A lower end of right turn prevention mechanism 154 supports right front wheel 131R.

Right damper 153 and right turn prevention mechanism 154 support right front wheel 131R to associate right bracket 147 with right front wheel 131R to prevent a relative change in the direction of right bracket 147 and the direction of right front wheel 131R.

Center steering arm 162 and tie rod 165 are disposed above left front wheel 131L and right front wheel 131R. One end portion of center steering arm 162 is fixed to steering shaft 161, and center steering arm 162 turns along with steering shaft 161. The other end portion of center steering arm 162 is supported by tie rod 165. Center steering arm 162 transmits the turning of steering shaft 161 to tie rod 165.

Left steering arm 163 is fixed to left bracket 146.

Right steering arm 164 is fixed to right bracket 147.

Tie rod 165 supports center steering arm 162, left steering arm 163, and right steering arm 164 and transmits the turning of center steering arm 162 to left steering arm 163 and right steering arm 164.

According to the above configuration, when handlebar 160 is operated to turn steering shaft 161 and center steering arm 162, left bracket 146 and right bracket 147 turn at the same angle as shown in FIG. 7. As a result, left front wheel 131L and right front wheel 131R are steered in the same direction T.

In the present description, the upper end of fuel tank 210 denotes the upper end of a fuel filler neck. The front end, the rear end, the lower end, the left end, and the right end of fuel tank 210 refer to the front end, the rear end, the lower end, the left end, and the right end of the space housing the fuel.

The liquid level of the fuel stored in fuel tank 210 changes according to a change in the orientation of vehicle 100 or the road condition. Examples of the orientation change include an orientation of vehicle 100 tilting in the left-right direction during cornering and an orientation of vehicle 100 tilting in the front-rear direction during acceleration or deceleration. Examples of the road condition include an inclination, such as a slope, and unevenness of the road, such as stone pavement.

As shown in FIG. 3, fuel tank 210 is disposed between virtual line F1 and virtual line F2 in the front-rear direction of body frame 110. The front end of fuel tank 210 is disposed between virtual line F1 and virtual line F2, and the rear end of fuel tank 210 is disposed behind virtual line F2 in a side view of vehicle 100.

Virtual line F1 indicates the center between center position E1 of a right front wheel ground contacting portion and a left front wheel ground contacting portion and center line E2 in a side view when body frame 110 is in the upright state. Center line E2 indicates the center between center position E1 of the right front wheel ground contacting portion and the left front wheel ground contacting portion and center position E3 of a rear wheel ground contacting portion. Virtual line F2 indicates the center between center line E2 and center position E3 of the rear wheel ground contacting portion in a side view when body frame 110 is in the upright state. The left front wheel ground contacting portion denotes a ground contacting portion of left front wheel 131L. The right front wheel ground contacting portion denotes a ground contacting portion of right front wheel 131R. The rear wheel ground contacting portion denotes a ground contacting portion of rear wheel 134.

As shown in FIG. 2, the right end of fuel tank 210 is disposed on the right of virtual line H1, and the left end of fuel tank 210 is disposed on the left of virtual line H2 in a plan view when body frame 110 is in the upright state.

In vehicle 100 of the first preferred embodiment of the present invention, fuel tank 210 is preferably disposed such that the right end of fuel tank 210 is disposed slightly to the right of virtual line H1 while the left end of fuel tank 210 is disposed slightly to the left of virtual line H2.

Virtual line H1 indicates the center between right end position G1 of upper cross member 141 and lower cross member 142 and center position G2 of upper cross member 141 and lower cross member 142, in a front view when body frame 110 is in the upright state. Virtual line H2 denotes the center between left end position G3 of upper cross member 141 and lower cross member 142 and center position G2 of upper cross member 141 and lower cross member 142 in a front view when body frame 110 is in the upright state. Center position G2 denotes the center of upper cross member 141 and lower cross member 142 in the left-right direction. Center position G2 coincides with a plane including upper axis A and lower axis C. Left end position G3 is an end portion positioned at the left-most of the left end of upper cross member 141 and the left end of lower cross member 142.

FIG. 8 is a plan view showing a first variation of the disposition of the fuel tank in the vehicle according to the first preferred embodiment of the present invention. In FIG. 8, a broken line indicates the exterior of vehicle 100.

Fuel tank 210 may be disposed as follows in the left-right direction of body frame 110. As shown in FIG. 8, the right end of fuel tank 210 is preferably disposed on the right of virtual line H3, and the left end of fuel tank 210 is preferably disposed on the left of virtual line H4, in a plan view when body frame 110 is in the upright state. Fuel tank 210 is preferably disposed such that the right end of fuel tank 210 is disposed slightly to the right of virtual line H3 while the left end of fuel tank 210 is disposed slightly to the left of virtual line H4.

Virtual line H3 indicates the center between right upper axis AR (see FIGS. 3 and 4) and center axis G0 in a front view when body frame 110 is in the upright state. Virtual line H4 indicates the center between left upper axis AL (see FIGS. 3 and 4) and center axis G0 in a front view when body frame 110 is in the upright state. Center axis G0 indicates the center between right upper axis AR and left upper axis AL.

Figure 9:
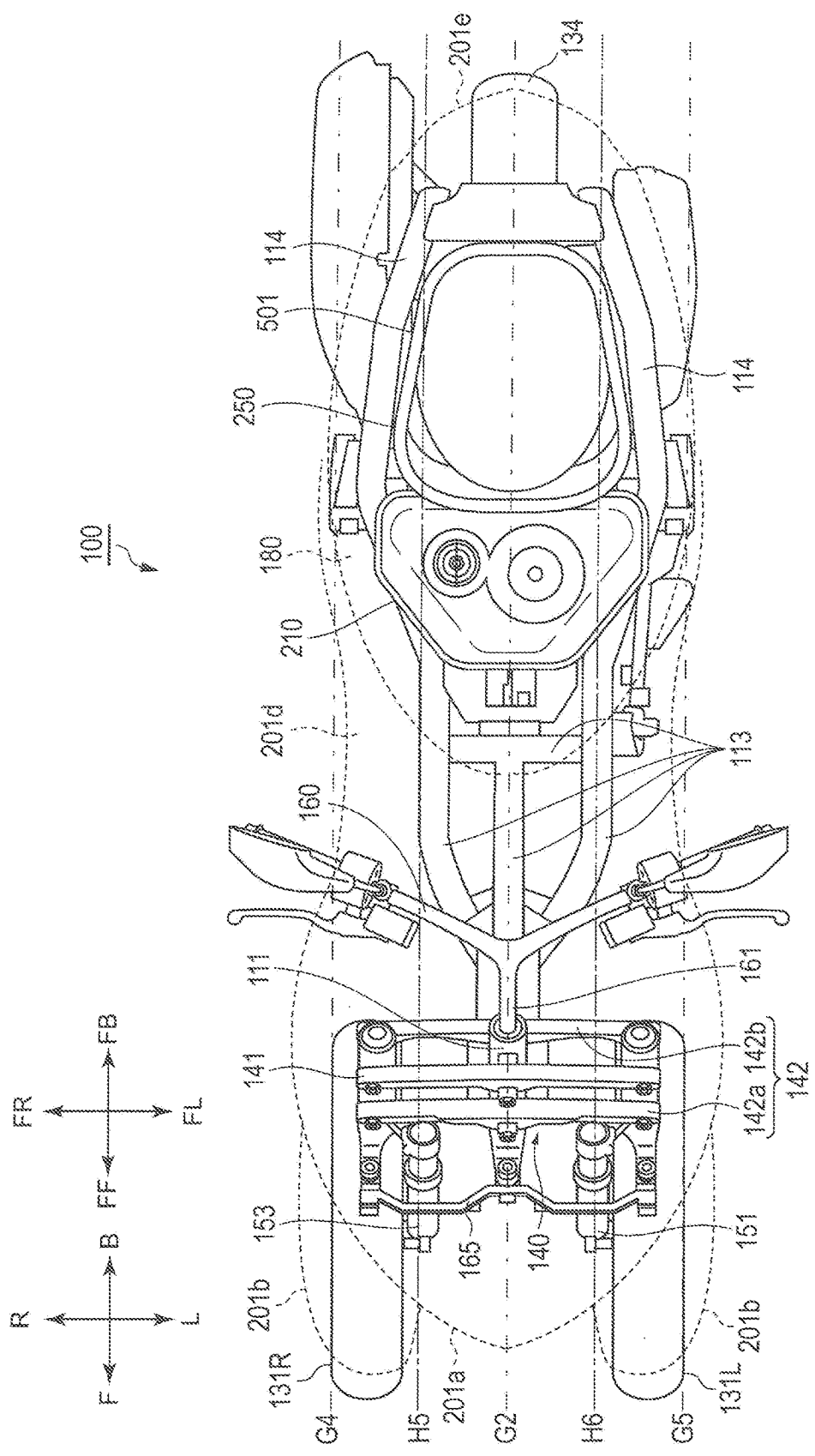
FIG. 9 is a plan view showing a second variation of the disposition of the fuel tank on the vehicle according to the first preferred embodiment of the present invention.

FIG. 9 is a plan view showing a second variation of the disposition of the fuel tank in the vehicle according to the first preferred embodiment of the present invention. In FIG. 9, a broken line indicates the exterior of vehicle 100.

Fuel tank 210 is preferably disposed in the left-right direction of body frame 110 as follows. As shown in FIG. 9, the right end of fuel tank 210 is preferably disposed on the right of virtual line H5, and the left end of fuel tank 210 is preferably disposed on the left of virtual line H6 in a plan view when body frame 110 is in the upright state. Fuel tank 210 is preferably disposed such that the right end of fuel tank 210 is disposed slightly to the right of virtual line H5 while the left end of fuel tank 210 is disposed slightly to the left of virtual line H6.

Virtual line H5 indicates the center between right end position G4 of right front wheel 131R and center position G2 in a front view when body frame 110 is in the upright state. Virtual line H6 indicates the center between left end position G5 of left front wheel 131L and center position G2 in a front view when body frame 110 is in the upright state. Center position G2 indicates the center between the left end of left front wheel 131L and the right end of right front wheel 131R.

In fuel tank 210 according to the first preferred embodiment of the present invention, the following disposition may be used based on the disposition described above.

The front end of fuel tank 210 is disposed behind center line E2 (see FIG. 3) in the front-rear direction of body frame 110.

Fuel tank 210 is disposed below seating surface 181 of seat 180. A portion of fuel tank 210 may be below seating surface 181, or the entire fuel tank 210 may be below seating surface 181.

Fuel tank 210 is disposed above left and right rear frames 114. Fuel tank 210 is fixed to left and right rear frames 114 through brackets. As shown in FIG. 2, fuel tank 210 is disposed at a position where a portion of fuel tank 210 overlaps with left and right rear frames 114 in a plan view.

As described above, according to vehicle 100 of the first preferred embodiment of the present invention, the front portion of vehicle 100 has a width in the left-right direction of the vehicle such that left front wheel 131L and right front wheel 131R are disposed side by side in the left-right direction. Therefore, fuel tank 210 with a large width in the left-right direction of the vehicle is easily mounted on vehicle 100. According to vehicle 100 of the first preferred embodiment of the present invention, the left end of fuel tank 210 is disposed on the left of virtual line H2 of FIG. 2, and the right end of fuel tank 210 is disposed on the right of virtual line H1 of FIG. 2. Therefore, the width of fuel tank 210 in the left-right direction of the vehicle increases. This reduces the width of fuel tank 210 in the height direction while ensuring a large capacity of fuel tank 210. Therefore, vehicle 100 is provided with a small amount of change in the position of center of gravity Q1 (see FIG. 10) based on the remaining fuel during operation, while a large capacity of fuel tank 210 is ensured.

Similarly, the left end of fuel tank 210 may be disposed on the left of virtual line H4 of FIG. 8, and the right end of fuel tank 210 may be disposed on the right of virtual line H3 of FIG. 8, as in the first variation 1 of vehicle 100 according to the first preferred embodiment of the present invention.

As a result, the width of fuel tank 210 in the left-right direction of the vehicle increases, and vehicle 100 with a small amount of change in the position of center of gravity Q1 (see FIG. 10) based on the remaining fuel during the operation is provided.

As in the second variation of vehicle 100 of the first preferred embodiment of the present invention, the left end of fuel tank 210 is preferably disposed on the left of virtual line H6 of FIG. 9, and the right end of fuel tank 210 is preferably disposed on the right of virtual line H5 of FIG. 9. As a result, the width of fuel tank 210 in the left-right direction of the vehicle increases, and vehicle 100 with a small amount of change in the position of center of gravity Q1 (see FIG. 10) based on the remaining fuel during the operation is provided.

Figure 10:
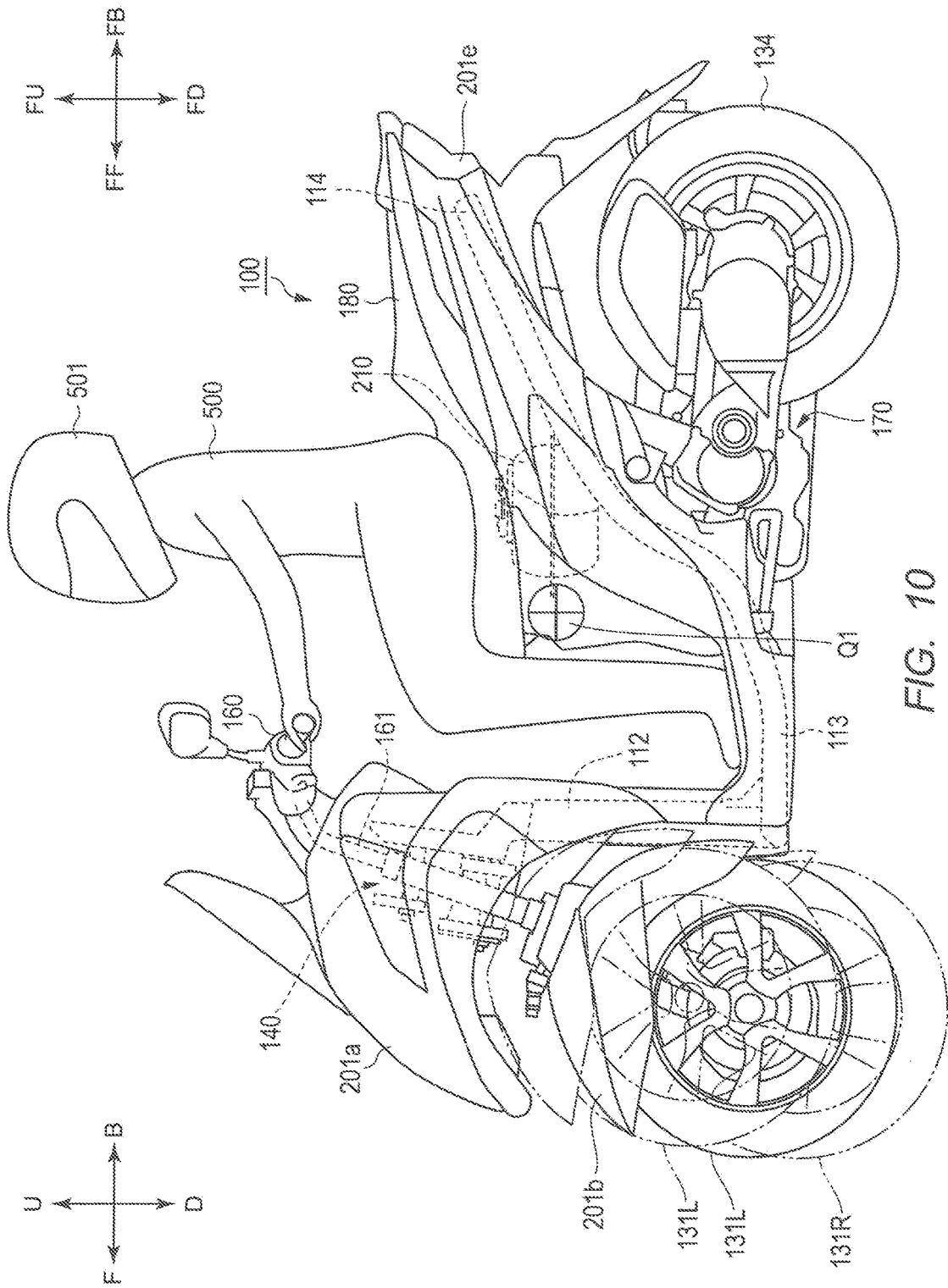
FIG. 10 is a side view showing the center of gravity of the vehicle with a rider on the vehicle according to the first preferred embodiment of the present invention.

FIG. 10 is a side view showing the center of gravity of the vehicle with the rider on the vehicle according to the first preferred embodiment of the present invention. In FIG. 10, alternate long and two short dashes lines indicate left front wheel 131L and right front wheel 131R when vehicle 100 tilts in the left-right direction.

According to vehicle 100 of the first preferred embodiment of the present invention, the front portion of vehicle 100 has a width in the left-right direction of the vehicle to accommodate the disposition of left front wheel 131L, right front wheel 131R, and link mechanism 140. Therefore, the width of vehicle 100 in the left-right direction of the vehicle forward of center line E2 in the front-rear direction of body frame 110 is large. According to vehicle 100, the rear end of fuel tank 210 is disposed forward of center line E2, so that it is easy to dispose fuel tank 210 with a large width in the left-right direction of the vehicle. Therefore, vehicle 100 with a small amount of change in the center of gravity during the operation is provided, while a large capacity of fuel tank 210 is ensured.

According to vehicle 100 of the first preferred embodiment of the present invention, fuel tank 210 is large in the front-rear direction of body frame 110. Therefore, the width of fuel tank 210 in the up-down direction of the vehicle is able to be reduced, while a large capacity of fuel tank 210 is ensured.

As a result, vehicle 100 is provided with a small amount of change in the center of gravity during the operation, while a large capacity of fuel tank 210 is ensured.

According to vehicle 100 of the first preferred embodiment of the present invention, link mechanism 140 supports a left front wheel support and a right front wheel support such that the left and right front wheel supports are turnable, and the left and right front wheel supports include upper portions and lower portions that support left and right front wheels 131L and 131R, respectively. Therefore, the disposition of the front end of fuel tank 210 behind center line E2 in the front-rear direction of body frame 110 prevents hindering of the movable range of link mechanism 140 associated with tilting of body frame 110 in the left-right direction of vehicle 100 and the movement of the left and right front wheels that tilt along with tilting of body frame 110 in the left-right direction of vehicle 100, and makes the degree of freedom in the disposition of fuel tank 210 high. Therefore, vehicle 100 is provided with a small amount of change in the center of gravity during operation, while a large capacity of fuel tank 210 is ensured.

According to vehicle 100 of the first preferred embodiment of the present invention, the width of fuel tank 210 in the left-right direction of the vehicle is greater than the width of right underframe 113Ab and left underframe 113Aa in the left-right direction of the vehicle. Furthermore, fuel tank 210 with a large width in the left-right direction of the vehicle is fixed to left and right body frames 110. Therefore, vehicle 100 is provided with a small amount of change in the center of gravity during operation, while a large capacity of fuel tank 210 is ensured.

According to vehicle 100 of the first preferred embodiment of the present invention, fuel tank 210 is disposed between virtual lines F1 and F2 of FIG. 3 in the front-rear direction of body frame 110. As a result of the above disposition, fuel tank 210 is close to center of gravity Q1 of vehicle 100. Therefore, vehicle 100 is provided with a small amount of change in the position of center of gravity Q1 during driving based on the remaining fuel, while a large capacity of fuel tank 210 is ensured.

Vehicle 100 of the first preferred embodiment of the present invention has a width in the left-right direction of the vehicle to accommodate the disposition of front wheel 131L, right front wheel 131R, and link mechanism 140. Therefore, it is easy to increase the width in the left-right direction of the vehicle behind center line E2 (see FIG. 3) in the front-rear direction of body frame 110. As a result, fuel tank 210 with a large width in the left-right direction of the vehicle is easily disposed even if the front end of fuel tank 210 is disposed behind center line E2.

According to vehicle 100 of the first preferred embodiment of the present invention, fuel tank 210 is disposed below seating surface 181. Therefore, fuel tank 210 is closer to center of gravity Q1 of vehicle 100 with the rider on the vehicle. As a result, vehicle 100 with a small amount of change in the position of center of gravity Q1 of vehicle 100 based on the remaining fuel is provided.

According to vehicle 100 of the first preferred embodiment of the present invention, fuel tank 210 is disposed above body frame 110 (specifically, left and right rear frames 114). Therefore, it is possible to increase the width of fuel tank 210 in the left-right direction of the vehicle without being restricted by body frame 110. Fuel tank 210 with a large width in the left-right direction of the vehicle is easily fixed without complicating the configuration of body frame 110.

Second Preferred Embodiment

Figure 11:
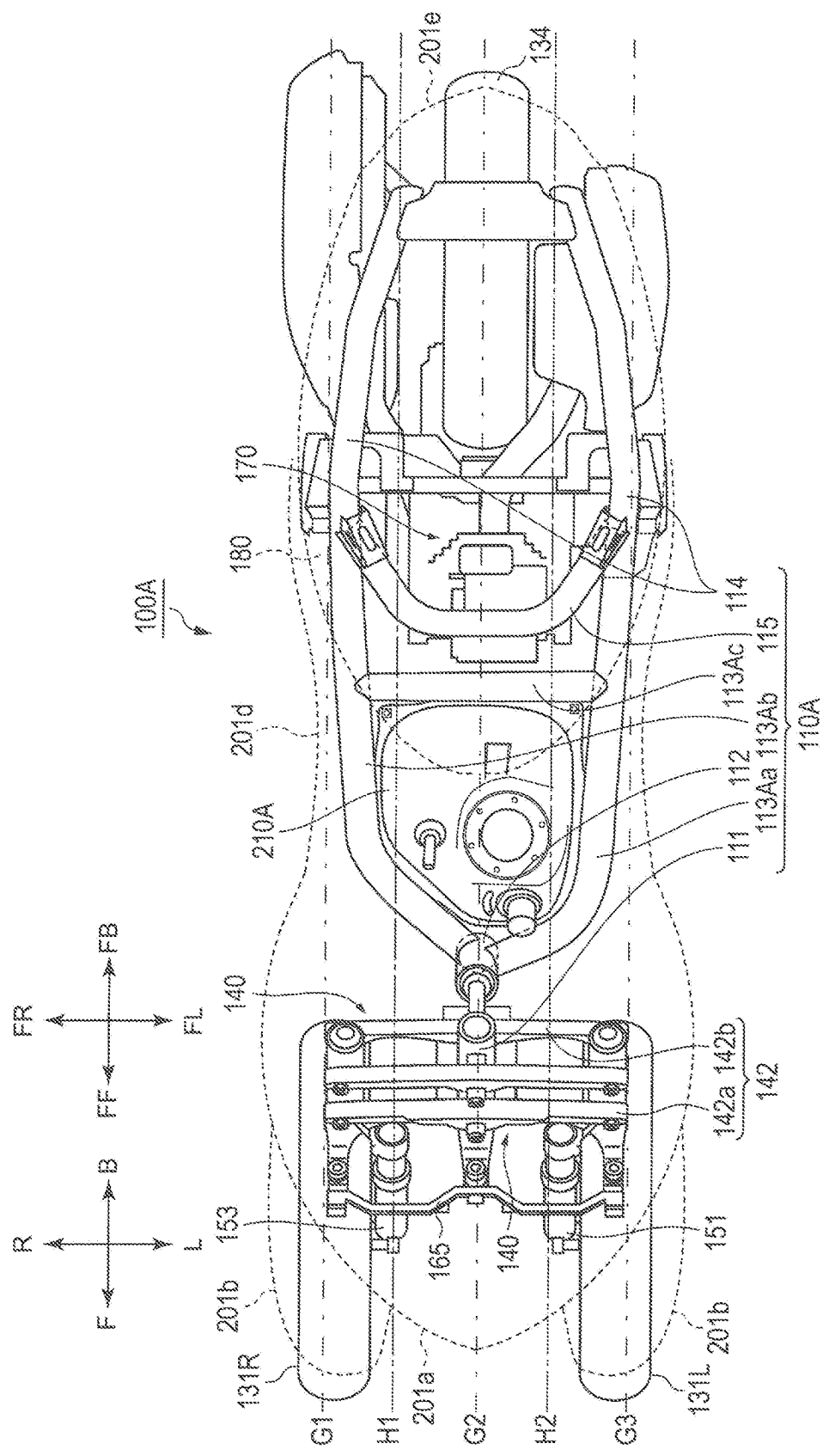
FIG. 11 is a plan view showing a vehicle according to a second preferred embodiment of the present invention.
Figure 12:
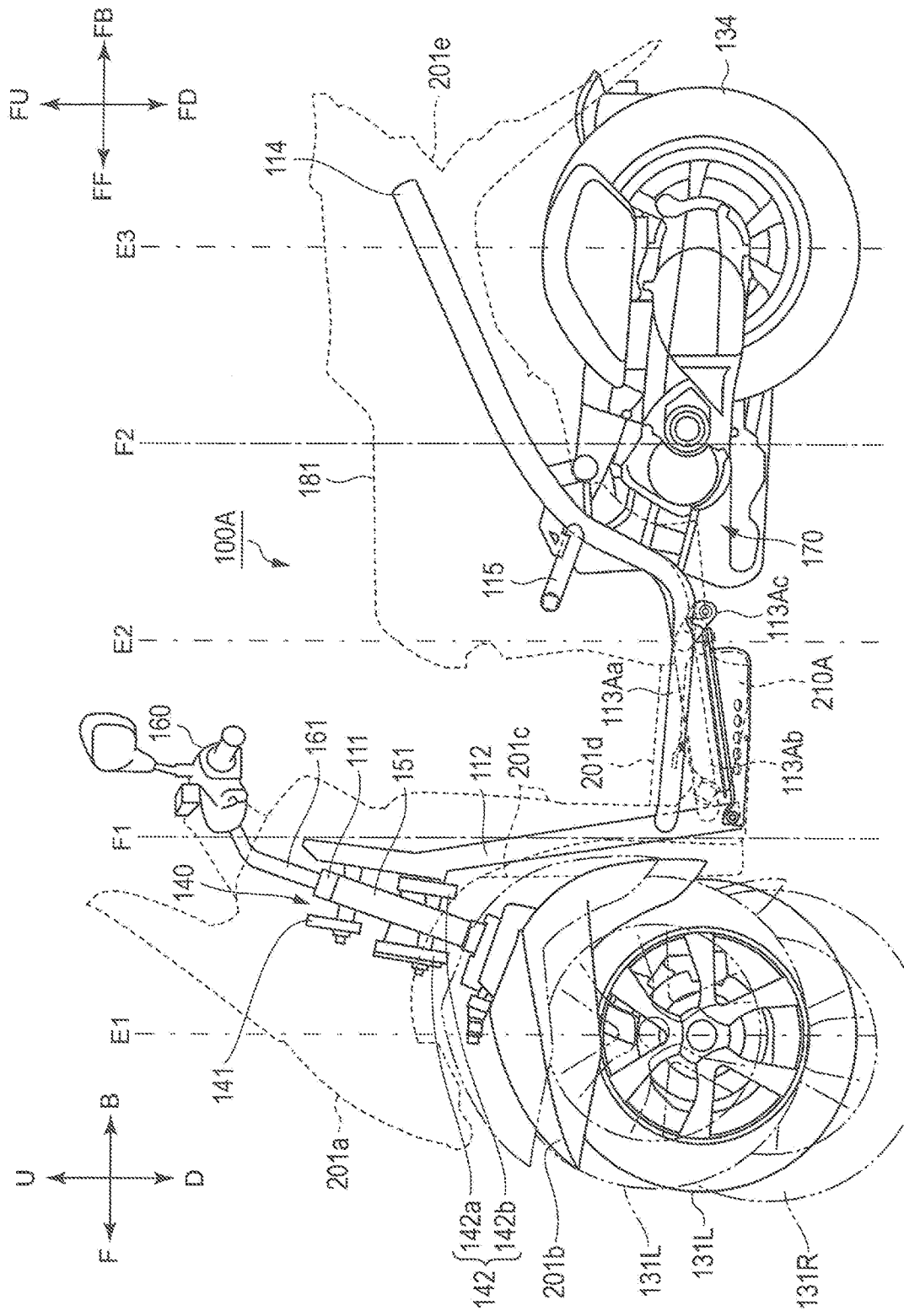
FIG. 12 is a side view showing the vehicle according to the second preferred embodiment of the present invention.

FIG. 11 is a plan view showing a vehicle according to a second preferred embodiment of the present invention. FIG. 12 is a side view showing the vehicle of the second preferred embodiment of the present invention. FIG. 11 shows a state of vehicle 100A in which handlebar 160 has been removed. In FIGS. 11 and 12, broken lines indicate the exterior of vehicle 100A. In FIG. 12, alternate long and two short dashes lines indicate left front wheel 131L and right front wheel 131R when vehicle 100 tilts in the left-right direction.

Vehicle 100A of the second preferred embodiment of the present invention is different from the vehicle of the first preferred embodiment of the present invention mainly in the configuration of body frame 110A and the disposition of fuel tank 210A. The same components as those of the first preferred embodiment are designated with the same reference signs, and the detailed description of the same components will not be repeated.

Body frame 110A includes link support 111, down frame 112, left underframe 113Aa, right underframe 113Ab, side underframe 113Ac, left and right rear frames 114, and intermediate frame 115.

Left underframe 113Aa, right underframe 113Ab, and side underframe 113Ac support floor portion 201d. Right underframe 113Ab and left underframe 113Aa are disposed below seat 180.

One end of left underframe 113Aa is connected to the lower portion of down frame 112 and extends in the front-rear direction while the other end is linked to left rear frame 114. Left underframe 113Aa is disposed on the left of the center of floor portion 201d in the left-right direction of body frame 110A.

One end of right underframe 113Ab is connected to the lower portion of down frame 112 and extends in the front-rear direction while the other end is linked to right rear frame 114. Right underframe 113Ab is disposed on the right of the center of floor portion 201d in the left-right direction of body frame 110A.

Side underframe 113Ac extends in the left-right direction and is located between left underframe 113Aa and right underframe 113Ab.

Intermediate frame 115 is located between left and right rear frames 114. Intermediate frame 115 is disposed below seat 180 to support seat 180.

Fuel tank 210A stores the fuel for power unit 170. A fuel hose is connected to fuel tank 210A. The fuel is supplied from fuel tank 210A to power unit 170 through the fuel hose. The vertical width of fuel tank 210A is smaller than the width of fuel tank 210A in the left-right direction of the vehicle and the width of fuel tank 210A in the front-rear direction of the vehicle.

As shown in FIG. 12, fuel tank 210A is disposed between virtual line F1 and virtual line F2 in the front-rear direction of body frame 110A. Virtual lines F1 and F2 are preferably the same as those described in the first preferred embodiment of the present invention (see FIG. 3).

As shown in FIG. 11, the right end of fuel tank 210A is disposed on the right of virtual line H1, and the left end of fuel tank 210A is disposed on the left of virtual line H2, in a plan view when body frame 110A is in the upright state. Virtual lines H1 and H2 are preferably the same as those described in the first preferred embodiment of the present invention (see FIG. 2).

Fuel tank 210A may be disposed such that the right end of fuel tank 210A is disposed slightly to the right of virtual line H1 while the left end of fuel tank 210A is disposed slightly to the left of virtual line H2.

Figure 13:
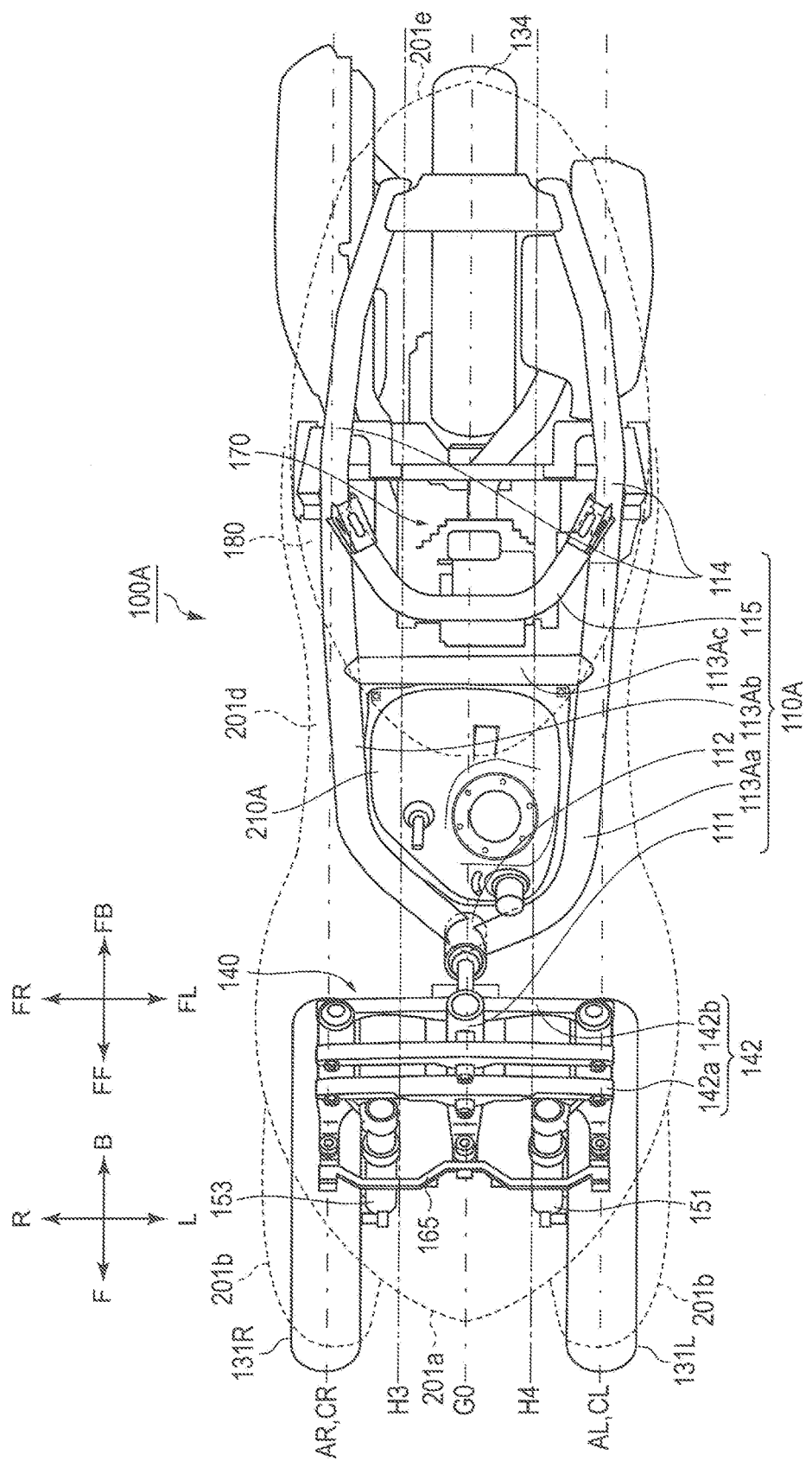
FIG. 13 is a plan view showing a first variation of a disposition of a fuel tank on the vehicle according to the second preferred embodiment of the present invention.

FIG. 13 is a plan view showing a first variation of the disposition of the fuel tank in the vehicle according to the second preferred embodiment of the present invention.

As shown in the first variation of FIG. 13, the right end of fuel tank 210A is preferably disposed on the right of virtual line H3, and the left end of fuel tank 210A is preferably disposed on the left of virtual line H4 in a plan view when body frame 110A is in the upright state. Fuel tank 210A is preferably disposed such that the right end of fuel tank 210A is disposed slightly to the right of virtual line H3 while the left end of fuel tank 210A is disposed slightly to the left of virtual line H4. Virtual lines H3 and H4 are preferably the same as those described in the first preferred embodiment of the present invention (see FIG. 8).

Figure 14:
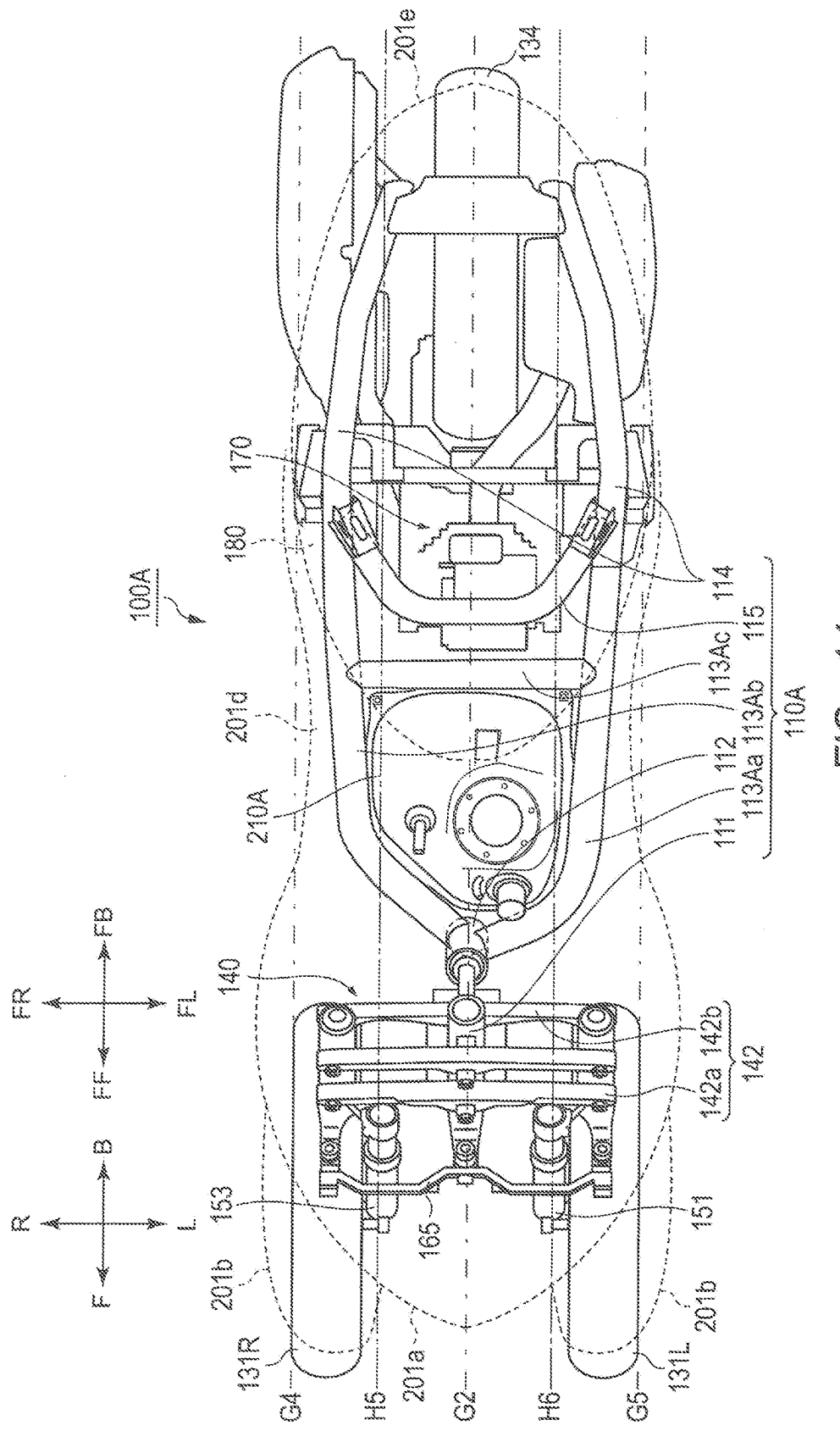
FIG. 14 is a plan view showing a second variation of the disposition of the fuel tank on the vehicle according to the second preferred embodiment of the present invention.

FIG. 14 is a plan view showing a second variation of the disposition of the fuel tank in the vehicle according to the second preferred embodiment of the present invention.

As shown in the second variation of FIG. 14, the right end of fuel tank 210A is preferably disposed on the right of virtual line H5, and the left end of fuel tank 210A is preferably disposed on the left of virtual line H6, in a plan view when body frame 110A is in the upright state. Fuel tank 210A is preferably disposed such that the right end of fuel tank 210A is disposed slightly to the right of virtual line H5 while the left end of fuel tank 210A is disposed slightly to the left of virtual line H6. Virtual lines H5 and H6 are preferably the same as those described in the first preferred embodiment of the present invention (see FIG. 9).

In fuel tank 210A according to the second preferred embodiment of the present invention, the following disposition may be used based on the disposition described above.

The rear end of fuel tank 210A is disposed in front of center line E2 (see FIG. 12) in the front-rear direction of body frame 110A.

Fuel tank 210A is disposed below the floor surface of floor portion 201d. More specifically, fuel tank 210A is disposed between the floor surface of floor portion 201d and the bottom surface of vehicle 100A. A portion of fuel tank 210A may be disposed in this manner, or the entire fuel tank 210A may be disposed in this manner.

Fuel tank 210A is disposed between left underframe 113Aa that is a left frame portion and right underframe 113Ab that is a right frame portion. More specifically, fuel tank 210A is disposed within an area surrounded by left underframe 113Aa, right underframe 113Ab, and side underframe 113Ac in a plan view. Side underframe 113Ac may be omitted.

Fuel tank 210A is fixed to left underframe 113Aa, right underframe 113Ab, and side underframe 113Ac through brackets. Side underframe 113Ac may be omitted.

As described above, according to vehicle 100A of the second preferred embodiment of the present invention, the front portion of vehicle 100A has a width in the left-right direction of the vehicle such that left front wheel 131L and right front wheel 131R are disposed side by side in the left-right direction. Therefore, particularly, the width in the left-right direction of the vehicle forward of center line E2 (see FIG. 12) is easily increased in the front-rear direction of body frame 110A. According to vehicle 100A of the second preferred embodiment of the present invention, the rear end of fuel tank 210A is disposed forward of center line E2. Therefore, fuel tank 210A with a large width in the left-right direction of the vehicle is easily mounted on vehicle 100A. As a result, the width of fuel tank 210A in the height direction is reduced, while a large capacity of fuel tank 210A is ensured. Therefore, vehicle 100A is provided with a small amount of change in the position of the center of gravity based on the remaining fuel during operation, while a large capacity of fuel tank 210A is ensured.

In vehicle 100A of the second preferred embodiment of the present invention, the left end of fuel tank 210A is disposed on the left of virtual line H2 of FIG. 11. The right end of fuel tank 210A is disposed on the right of virtual line H1 of FIG. 11. Therefore, the width of fuel tank 210A in the left-right direction of the vehicle is large. As a result, the width of fuel tank 210A in the height direction is reduced, while a large capacity of fuel tank 210A is ensured.

In vehicle 100A according to the second preferred embodiment of the present invention, fuel tank 210A is disposed between virtual lines F1 and F2 of FIG. 12 in the front-rear direction of body frame 110A. As a result of this disposition, fuel tank 210A is close to the center of gravity of the vehicle. Therefore, a vehicle is provided with a small amount of change in the position of the center of gravity during driving based on the remaining fuel, while a large capacity of fuel tank 210A is ensured.

In vehicle 100A according to the second preferred embodiment of the present invention, fuel tank 210A is disposed below the floor surface of floor portion 201d. There is a certain limitation for the level of the bottom surface (lower end of the body) of vehicle 100A to avoid a curbstone or the like. There is a certain limitation for the level of the floor surface of floor portion 201d to allow the driver to easily put his or her feet thereon. Under these conditions, fuel tank 210A is disposed below the floor surface of floor portion 201d to effectively utilize the space below floor portion 201d, so that fuel tank 210A with a low height and a large capacity is provided. Therefore, a vehicle with a small amount of change in the position of the center of gravity based on the remaining fuel during operation is provided, while a large capacity of fuel tank 210A is ensured.

According to vehicle 100A of the second preferred embodiment of the present invention, fuel tank 210A is disposed between left underframe 113Aa and right underframe 113Ab. Therefore, fuel tank 210A is easily fixed below the floor surface of floor portion 201d without complicating the configuration of the frames that support floor portion 201d.

Various preferred embodiments of the present invention have been described thus far.

The dispositions of fuel tanks 210 and 210A have been specifically described in each of the preferred embodiments of the present invention. However, the dispositions of the fuel tanks 210 and 210A are not limited to the dispositions described in the preferred embodiments.

For example, the disposition of the fuel tank in the front-rear direction may be changed as follows. The front end of fuel tank 210 is preferably disposed behind center line E2 in the front-rear direction of body frame 110 in the specific example illustrated in the first preferred embodiment (see FIG. 3). The rear end of fuel tank 210A is disposed forward of center line E2 in the front-rear direction of body frame 110A in the specific example illustrated in the second preferred embodiment (see FIG. 12). However, fuel tanks 210 and 210A may overlap with center line E2 in the front-rear direction of body frames 110 and 110A.

Fuel tank 210 is preferably disposed below seating surface 181 of seat 180 in the up-down direction of body frame 110 in the description of the first preferred embodiment. In this disposition, a portion of fuel tank 210 may be disposed below seating surface 181 in the up-down direction of body frame 110, or the entire fuel tank 210 may be disposed below seating surface 181 in the up-down direction of body frame 110.

Fuel tank 210A is preferably disposed below the floor surface of floor portion 201d in the up-down direction of body frame 110 in the description of the second preferred embodiment. In this disposition, a portion of fuel tank 210A may be disposed below the floor surface of floor portion 201d in the up-down direction of body frame 110, or the entire fuel tank 210A may be disposed below the floor surface of floor portion 201d in the up-down direction of body frame 110.

The front end of fuel tank 210 is preferably disposed between virtual line F1 and virtual line F2, and the rear end of fuel tank 210 is disposed behind virtual line F2 in a side view of vehicle 100 in the description above. However, fuel tank 210 may be disposed anywhere between virtual line F1 and virtual line F2 in the front-rear direction of body frame 110. Fuel tank 210 may be disposed anywhere as long as at least a portion of fuel tank 210 is disposed between virtual line F1 and virtual line F2 in the front-rear direction of body frame 110. Therefore, the dispositions of fuel tank 210 according to various preferred embodiments of the present invention include the following dispositions. The front and rear ends of fuel tank 210 may be positioned between virtual lines F1 and F2 in a side view of vehicle 100. The front end of fuel tank 210 may be positioned forward of virtual line F1, while the rear end of fuel tank 210 is positioned between virtual lines F1 and F2 in a side view of vehicle 100. The front end of fuel tank 210 may be positioned forward of virtual line F1, while the rear end of fuel tank 210 is positioned behind virtual line F2 in a side view of vehicle 100.

The disposition of the fuel tank in the left-right direction may be changed as follows.

The right end of fuel tank 210 is preferably disposed on the right of virtual line H1, and the left end of fuel tank 210 is preferably disposed on the left of virtual line H2 in the first preferred embodiment described with reference to FIG. 2. However, the disposition of fuel tank 210 is not limited to the specific disposition illustrated in FIG. 2. The right end of fuel tank 210 may be disposed slightly to the right of virtual line H1, and the left end of fuel tank 210 may be disposed slightly to the left of virtual line H2.

The right end of fuel tank 210 is disposed on the right of virtual line H3, and the left end of fuel tank 210 is disposed on the left of virtual line H4 in the first variation of the first preferred embodiment described with reference to FIG. 8. However, the disposition of fuel tank 210 is not limited to the specific disposition illustrated in FIG. 8. The right end of fuel tank 210 may be disposed slightly to the right of virtual line H3, and the left end of fuel tank 210 may be disposed slightly to the left of virtual line H4.

The right end of fuel tank 210 is preferably disposed on the right of virtual line H5, and the left end of fuel tank 210 is preferably disposed on the left of virtual line H6 in the second variation of the first preferred embodiment described with reference to FIG. 9. However, the disposition of fuel tank 210 is not limited to the specific disposition illustrated in FIG. 9. The right end of fuel tank 210 may be disposed slightly to the right of virtual line H5, and the left end of fuel tank 210 may be disposed slightly to the left of virtual line H6.

The right end of fuel tank 210A is disposed on the right of virtual line H1, and the left end of fuel tank 210A is disposed on the left of virtual line H2 in the second preferred embodiment described with reference to FIG. 11. However, the disposition of fuel tank 210A is not limited to the specific disposition illustrated in FIG. 11. The right end of fuel tank 210A may be disposed slightly to the right of virtual line H1, and the left end of fuel tank 210A may be disposed slightly to the left of virtual line H2.

The right end of fuel tank 210A is preferably disposed on the right of virtual line H3, and the left end of fuel tank 210A is preferably disposed on the left of virtual line H4 in the first variation 1 of the second preferred embodiment described with reference to FIG. 13. However, the disposition of fuel tank 210A is not limited to the specific disposition illustrated in FIG. 13. The right end of fuel tank 210A may be disposed slightly to the right of virtual line H3, and the left end of fuel tank 210A may be disposed slightly to the left of virtual line H4.

The right end of fuel tank 210A is preferably disposed on the right of virtual line H5, and the left end of fuel tank 210A is preferably disposed on the left of virtual line H6 in the second variation 2 of the second preferred embodiment described with reference to FIG. 14. However, the disposition of fuel tank 210A is not limited to the specific disposition illustrated in FIG. 14. The right end of fuel tank 210A may be disposed slightly to the right of virtual line H5, and the left end of fuel tank 210A may be disposed slightly to the left of virtual line H6.

Fuel tank 210A is preferably disposed between left underframe 113Aa and right underframe 113Ab in the description of the second preferred embodiment. In this disposition, a portion of fuel tank 210A may be positioned between left underframe 113Aa and right underframe 113Ab, or the entire fuel tank 210A may be positioned between left underframe 113Aa and right underframe 113Ab.

The disposition of the fuel tank in the up-down direction may be changed as follows. Fuel tank 210 is disposed below seating surface 181 of seat 180 in the example of the disposition of the fuel tank in the height direction described in the first preferred embodiment. Fuel tank 210A is disposed below the floor surface of floor portion 201d in the up-down direction of body frame 110 in the example of the disposition of the fuel tank in the height direction described in the second preferred embodiment. However, the fuel tank may be disposed above the upper ends of the left and right front wheels in the up-down direction of body frame 110 in a front view when the body frame is in the upright state. The fuel tank may be disposed below the upper ends of the left and right front wheels in the up-down direction of body frame 110. The fuel tank may be disposed at a level overlapping with the upper ends of the left and right front wheels in the up-down direction of body frame 110.

The configurations of vehicles 100 and 100A and the structures of the components are specifically illustrated in the accompanying drawings in the description of the preferred embodiments of the present invention. However, any structure of the vehicle and the components of the vehicle may be used.

For example, vehicle 100 includes floor portion 201d forward of seat 180 in a plan view in the examples described above. However, the vehicle may be a type in which floor portion 201d is not included, and the rider straddles the seat.

Link support 111 also defines and functions as a head tube in the examples described above. However, the vehicle may include a head tube separate from link support 111.

In the link mechanism, the upper cross member may include a front upper cross member with a portion disposed in front of link support 111 and a rear upper cross member with a portion disposed behind link support 111. The lower cross member may include only a front lower cross member or may include only a rear lower cross member. The link mechanism may include the upper cross member and the lower cross member, and the link mechanism may include one or a plurality of cross members disposed between the upper cross member and the lower cross member in the up-down direction of the body frame.

The left and right frame portions are not limited to left underframe 113Aa and right underframe 113Ab. The vehicle may include other left and right frames below floor portion 201d in the up-down direction of body frame 110 and above the underframes in the up-down direction of body frame 110.

The seat may include a seating surface of a tandem rider (fellow passenger) in addition to the seating surface of the rider. The position of the seating surface of the tandem rider is not particularly limited.

The present invention can be embodied by a large number of different preferred embodiments. This disclosure should be construed as providing preferred embodiments of the principle of the present invention. A large number of illustrative preferred embodiments are described here with the understanding that the preferred embodiments are not intended to limit the present invention to the preferred embodiments described and/or illustrated here.

Some illustrative preferred embodiments of the present invention are described here. The present invention is not limited to various preferred embodiments described here. The present invention includes any preferred embodiments including equivalent elements, corrections, deletions, combinations (for example, combinations with features across various preferred embodiments), improvements, and/or changes that can be recognized by those skilled in the art based on this disclosure. The limitations of the appended claims should be broadly interpreted based on the terms used in the appended claims, and the limitations should not be limited by the preferred embodiments described in the present description or in the prosecution of the present application. The preferred embodiments should be construed as non-exclusive. For example, the terms "preferably" and "may" are non-exclusive in this disclosure, meaning "preferable, but not limited to this" and "may be, but not limited to this."

The disclosure of Japanese Patent Application No. 2014-017273, filed on Jan. 31, 2014, including the specification, drawings, and abstract is incorporated herein by reference in its entirety.

Various preferred embodiments of the present invention are useful for a vehicle including a left front wheel, a right front wheel, and a rear wheel that tilt in the left-right direction along with a body frame.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
    a body frame;
    a right front wheel and a left front wheel disposed side by side in a left-right direction of the body frame, the right and the left front wheels being tiltable in the left-right direction of the vehicle along with the body frame;
    a rear wheel tiltable in the left-right direction of the vehicle along with the body frame;
    a right front wheel support including an upper portion, and a lower portion that supports the right front wheel;
    a left front wheel support including an upper portion, and a lower portion that supports the left front wheel;
    a link mechanism including:
        a right-side rod that supports the upper portion of the right front wheel support such that the upper portion thereof is turnable around a right axis extending in an up-down direction of the body frame;
        a left-side rod that supports the upper portion of the left front wheel support such that the upper portion thereof is turnable around a left axis which is parallel or substantially parallel to the right axis;
        an upper cross member including a right end portion that supports an upper portion of the right-side rod such that the upper portion thereof is turnable, a left end portion that supports an upper portion of the left-side rod such that the upper portion thereof is turnable, and an intermediate portion that is supported by the body frame so as to be turnable around an upper axis extending in a front-rear direction of the body frame; and
        a lower cross member including a right end portion that supports a lower portion of the right-side rod such that the lower portion thereof is turnable, a left end portion that supports a lower portion of the left-side rod such that the lower portion thereof is turnable, and an intermediate portion that is supported by the body frame so as to be turnable around a lower axis which is parallel or substantially parallel to the upper axis;
    a power unit that generates a driving force of the rear wheel; and
    a fuel tank that stores fuel supplied to the power unit; wherein
    the fuel tank is disposed between a first center and a second center, the first center being located between a third center and right and left front wheel ground contacting portions, the second center being located center between the third center and a rear wheel ground contacting portion, the third center being located between the right and the left front wheel ground contacting portions and the rear wheel ground contacting portion in the front-rear direction of the body frame in a side view when the body frame is in an upright state, the right front wheel ground contacting portion, the left front wheel ground contacting portion, and the rear wheel ground contacting portion being where the right front wheel, the left front wheel, and the rear wheel contact the ground, respectively; and
    a leftmost end of the fuel tank is disposed on the left of a center between a center of the upper cross member and the lower cross member and leftmost ends of the upper cross member and the lower cross member, and a rightmost end of the fuel tank is disposed on the right of a center between the center of the upper cross member and the lower cross member and rightmost ends of the upper cross member and the lower cross member in the left-right direction of the body frame in a plan view when the body frame is in the upright state.

2. The vehicle according to claim 1, wherein a rear end of the fuel tank is disposed forward of the third center.

3. The vehicle according to claim 1, wherein the fuel tank overlaps with the third center.

4. The vehicle according to claim 1, wherein a front end of the fuel tank is disposed behind the third center.

5. The vehicle according to claim 1, further comprising a seat including a seating surface for receiving a rider, wherein the fuel tank is disposed below the seating surface in the up-down direction of the body frame.

6. The vehicle according to claim 5, wherein the body frame includes a right frame portion and a left frame portion that are disposed below the seat in the up-down direction of the body frame, and the fuel tank is disposed above the right frame portion and the left frame portion in the up-down direction of the body frame.

7. The vehicle according to claim 1, further comprising:
    a seat including a seating surface for receiving a rider; and
    a floor portion positioned forward of the seat in the front-rear direction of the body frame, the floor portion including a floor surface for receiving a rider's feet; wherein
    the fuel tank is disposed below the floor surface in the up-down direction of the body frame.

8. The vehicle according to claim 7, wherein the body frame includes a left frame portion and a right frame portion below the floor surface in the up-down direction of the body frame, the left frame portion and the right frame portion extend in the front-rear direction of the body frame, and the fuel tank is disposed between the left frame portion and the right frame portion.

\* \* \* \* \*